(12) United States Patent
Ramamurthy et al.

(10) Patent No.: US 12,433,569 B2
(45) Date of Patent: Oct. 7, 2025

(54) ULTRASOUND TRANSDUCER ASSEMBLY

(71) Applicant: Cordance Medical Inc., Mountain View, CA (US)

(72) Inventors: Bhaskar S. Ramamurthy, Los Altos, CA (US); Daniel E. Need, Mountain View, CA (US); John D. Marshall, Los Gatos, CA (US); Jonathan B. Hofius, La Honda, CA (US); Mallika S. Keralapura, San Jose, CA (US)

(73) Assignee: Cordance Medical Inc., Mountain View, CA (US)

( * ) Notice: Subject to any disclaimer, the term of this patent is extended or adjusted under 35 U.S.C. 154(b) by 62 days.

(21) Appl. No.: 17/874,166

(22) Filed: Jul. 26, 2022

(65) Prior Publication Data

US 2023/0082109 A1  Mar. 16, 2023

Related U.S. Application Data

(63) Continuation of application No. PCT/US2021/015095, filed on Jan. 26, 2021.
(Continued)

(51) Int. Cl.
*A61B 8/00* (2006.01)
*A61B 8/08* (2006.01)

(52) U.S. Cl.
CPC .......... *A61B 8/4281* (2013.01); *A61B 8/0808* (2013.01); *A61B 8/4209* (2013.01)

(58) Field of Classification Search
CPC .............. A61N 2007/0078; A61N 7/02; A61N 2007/0021; A61B 8/4483; A61B 8/4477;
(Continued)

(56) References Cited

U.S. PATENT DOCUMENTS 4,231,373 A  * 11/1980  Waxman .................. A61B 8/00
73/621
5,095,907 A  * 3/1992  Kudo ................. A61B 17/2251
601/4
(Continued)

FOREIGN PATENT DOCUMENTS

DE          20320928 U1    7/2005
DE       102011102570 A1  11/2012
(Continued)

OTHER PUBLICATIONS

Extended European Search Report for European Application No. 21747882.5, mailed Jan. 2, 2024.
(Continued)

*Primary Examiner* — Keith M Raymond
*Assistant Examiner* — Milton Truong
(74) *Attorney, Agent, or Firm* — Klarquist Sparkman, LLP

(57) ABSTRACT

An ultrasound transducer assembly is connectable to an ultrasound system and comprises one or more ultrasound transducer elements supported by a cap. The ultrasound transducer elements are operable to direct ultrasound energy toward brain tissue of a subject and/or to receive echo ultrasound energy when the ultrasound transducer assembly is mounted on the head of the subject. Some embodiments include a fillable jacket coupled to the inner surface of the cap and in acoustic contact with the one or more transducer elements.

28 Claims, 17 Drawing Sheets

Related U.S. Application Data

(60) Provisional application No. 62/966,348, filed on Jan. 27, 2020.

(58) Field of Classification Search
CPC .......... A61B 8/4444; A61B 2017/2253; A61B 8/0808; A61B 8/4209; A61B 8/4281; A61B 17/2251; A61B 8/4272; A61B 8/429

See application file for complete search history.

(56) References Cited

U.S. PATENT DOCUMENTS

| | | | | |
|---|---|---|---|---|
| 6,027,449 | A * | 2/2000 | Mazess | A61B 8/4281 600/459 |
| 8,353,853 | B1 * | 1/2013 | Kyle | A61N 7/00 600/459 |
| 2005/0277824 | A1 * | 12/2005 | Aubry | A61B 8/0816 600/407 |
| 2006/0184070 | A1 | 8/2006 | Hansmann et al. | |
| 2006/0235303 | A1 * | 10/2006 | Vaezy | A61B 8/4281 600/459 |
| 2009/0088670 | A1 | 4/2009 | Warlick et al. | |
| 2010/0131030 | A1 | 5/2010 | Firlik et al. | |
| 2011/0046694 | A1 | 2/2011 | Forsell | |
| 2014/0260632 | A1 | 9/2014 | Tateyama | |
| 2014/0316269 | A1 * | 10/2014 | Zhang | A61B 8/4209 602/1 |
| 2016/0089110 | A1 * | 3/2016 | Milkowski | A61B 8/4281 600/472 |
| 2016/0220850 | A1 | 8/2016 | Tyler | |
| 2016/0236013 | A1 * | 8/2016 | Carol | A61B 18/04 |
| 2018/0271480 | A1 * | 9/2018 | Kawabata | A61B 8/4494 |
| 2018/0318611 | A1 * | 11/2018 | Chen | A61N 7/02 |
| 2018/0360400 | A1 * | 12/2018 | Simon | A61B 8/4416 |
| 2019/0247679 | A1 * | 8/2019 | Vincenot | A61B 8/4411 |
| 2022/0134608 | A1 * | 5/2022 | Staebler | B29C 39/22 264/494 |

FOREIGN PATENT DOCUMENTS

| | | |
|---|---|---|
| DE | 202014007200 U1 | 12/2014 |
| KR | 20140137870 A | 12/2014 |
| KR | 20190058538 A | 5/2019 |
| WO | WO2018/026738 | 2/2018 |
| WO | WO2019/008579 | 1/2019 |

OTHER PUBLICATIONS

Office Action for Japanese Patent Application No. 2022-545376, mailed Jul. 9, 2024.

International Search Report and Written Opinion for PCT/US2021/015095, mailed May 13, 2021.

\* cited by examiner

ULTRASOUND TRANSDUCER ASSEMBLY

CROSS-REFERENCE TO RELATED APPLICATIONS

This application is a U.S. bypass continuation application of International Application No. PCT/US2021/015095, filed 26 Jan. 2021, which in turn claims priority from U.S. Application No. 62/966,348 filed 27 Jan. 2020. For purposes of the United States, this application claims the benefit under 35 U.S.C. § 119 of U.S. Application No. 62/966,348 filed 27 Jan. 2020 and titled CONFORMABILITY FOR ULTRASOUND TRANSDUCERS which is hereby incorporated herein by reference for all purposes.

TECHNICAL FIELD

This invention relates generally to ultrasound transducers, and in particular to ultrasound transducer assemblies that are connectable to an ultrasound system to deliver ultrasound energy to and/or receive echo ultrasound energy from brain tissue of a subject.

BACKGROUND

Ultrasound is often used in medicine to detect abnormal masses (e.g. tumors) and/or changes in the appearance of organs and tissues. In an ultrasound exam, an ultrasound transducer sends out high-frequency sound waves and detects echo waves that are reflected by organs, tissues, etc. Ultrasound can be delivered to brain tissues for both therapeutic and diagnostic purposes.

To establish good acoustic coupling between an ultrasound transducer element and tissue of a patient, a good acoustic coupling medium must be located between the ultrasound transducer element and the tissue to provide an efficient path for ultrasound propagation. Hence, it is common for medical practitioners to perform ultrasound exams by manually pressing an ultrasound probe against the skin of the subject.

The brain is contained in a hard bony skull that has curved surfaces. The contour of the skull or head is usually irregular and non-linear. The shapes and sizes of the skull can also vary from subject to subject.

In some cases, it is desirable to use multiple ultrasound transducer elements to deliver ultrasound to the brain of a subject. For example, it may be desirable to use multiple transducers to increase signal-to-noise ratio and/or to provide efficient coverage of a target region. In such cases, multiple ultrasound transducer elements may be provided as part of an ultrasound transducer assembly.

It is challenging to design an ultrasound transducer assembly for delivering ultrasound energy to the brain due to the presence of the skull. The physical and acoustic properties of the skull present challenges to couple ultrasound energy in and out of the brain. Some ultrasound transducer assemblies (e.g. those used for diagnostic imaging) are not designed to conform to the complex contours of the skull or head, leaving air gaps that can lead to poor acoustic coupling between the transducer elements and brain tissue. Other ultrasound transducer assemblies are not compatible with different patients or require long setup times.

There remains a need for ultrasound transducer assemblies that can accommodate the various size and shapes of the head of various patients. There also remains a need for ultrasound transducer assemblies that provide good acoustic coupling between ultrasound transducers and the brain of the subjects.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

This invention has a number of aspects. These include, without limitation:
  Ultrasound transducer assemblies useful for delivering ultrasound energy to the brain;
  Ultrasound transducer assemblies comprising fillable jackets for acoustic coupling to heads of subjects;
  Fillable jackets for ultrasound transducer assemblies;
  Ultrasound transducer assemblies that include positionable transducers; and
  Related methods.

One aspect of the invention relates to an ultrasound transducer assembly that is connectable to an ultrasound system. The assembly comprises a mechanical substructure having an outer surface and an inner surface. The inner surface is shaped to define a cavity therein. The mechanical substructure supports one or more ultrasound transducer elements. Each of the ultrasound transducer elements is operable to direct ultrasound energy toward the cavity and/or to receive echo ultrasound energy. The assembly also comprises a fillable jacket coupled to the inner surface of the mechanical substructure and in acoustic contact with the one or more transducer elements. The fillable jacket lines the inside surface of the mechanical substructure. The fillable jacket comprises a deformable receptacle for holding a volume of an acoustic transmission fluid in a deformable chamber of the receptacle, a port in fluid communication with the deformable chamber, and a valve for controlling fluid flow through the port to thereby control the volume of the acoustic transmission fluid in the deformable chamber.

In some embodiments, the fillable jacket is acoustically coupled to the mechanical substructure. In some embodiments, a layer of acoustic coupling gel is located between the fillable jacket and the mechanical substructure.

The deformable receptacle may be made of a material selected from the group consisting of: polyurethane, latex and silicone. The acoustic transmission fluid may be selected from the group consisting of: degassed water, mineral oil and gel.

In some embodiments, the ultrasound transducer assembly comprises a second port in fluid communication with the deformable chamber and a second valve for controlling fluid flow through the second port. The first port may be placed in fluid communication with an output of an hydraulic system through the first valve to receive the acoustic transmission fluid in the deformable chamber. The second port may be placed in fluid communication with the input of the hydraulic system through the second valve to return the acoustic transmission fluid from the deformable chamber to the hydraulic system. The hydraulic system may comprise electronics configured to continuously pump the acoustic transmission fluid into the deformable chamber through the first port and to continuously withdraw the acoustic transmission fluid from the deformable chamber through the second port. In some embodiments, the first and second valves comprise respective electronic sensors configured to detect a rate of fluid flow through the respective valves.

In some embodiments, the ultrasound transducer assembly comprises an air bubble detector for detecting air bubbles in the acoustic transmission fluid. The air bubble detector may include at least one of the ultrasound transducer elements (i.e. an ultrasound transducer element configured to deliver a pulse of ultrasound energy). The hydraulic system may be configured to pump the acoustic transmission fluid into the deformable chamber through the first port and to withdraw the acoustic transmission fluid from the deformable chamber through the second port in response to detection of air bubbles in the acoustic transmission fluid. The hydraulic system may be configured pump the acoustic transmission fluid into the deformable chamber at a faster rate than the rate of withdrawing the acoustic transmission fluid from the deformable chamber.

In some embodiments, the fillable jacket comprises an O-ring extending around a perimeter of the deformable receptacle. The fillable jacket may be mechanically coupled to the mechanical substructure by inserting an edge portion of the fillable jacket and the O-ring into a channel.

In some embodiments the O-ring comprises segments or strips of an electrically conductive material that are in electrical contact with corresponding electrically conductive portions of the channel when the O-ring is inserted in the channel. The segments of the electrically conductive material may extend partially around the perimeter of the deformable receptacle. The conductive portions of the O-ring may be applied to carry signals to and/or from sensors on the fillable jacket.

In some embodiments, the O-ring further comprises conductive pads in electrical contact with the segments of electrically conductive material. The conductive pads may, for example, extend in a poloidal direction around part of the O-ring. Electrical conductors may be provided on an exterior surface of the deformable receptacle, for example by printing. The conductive pads of the O-ring may contact corresponding electrical conductors of the fillable jacket when the O-ring is mechanically coupling the fillable jacket to the substructure. In some embodiments, the O-ring comprises first and second electrically conductive pads that are in electrical contact with corresponding first and second segments of electrically conductive material and corresponding first and second electrical conductors supported on a surface of the deformable receptacle. The electrical conductors may be located on an inner exterior surface of the deformable receptacle. The electrical conductors may be electrically connected to a sensor (e.g. a temperature sensor).

In some embodiments, the ultrasound transducer assembly further comprises one or more baffles located in the deformable chamber. The baffles may be made of a material that has essentially the same acoustic impedance as that of the acoustic transmission fluid. The baffles may have a thickness that is less than the wavelength of sound in the acoustic transmission fluid. For example, the baffles have a thickness in the range of 0.5 mm to 1.5 mm. The baffles may comprise perforations located between the baffles and an outer surface of the deformable receptacle.

In some embodiments, the fillable jacket comprises a temperature sensor. The temperature sensor may be configured to measure a temperature of acoustic transmission fluid in the deformable chamber and/or a temperature of the skin of the subject wearing the ultrasound transducer assembly. In some embodiments, the fillable jacket is detachably coupled to the mechanical substructure. In some embodiments, the fillable jacket is made of a disposable material. In some embodiments, the fillable jacket further comprises one or more of: an electroencephalography sensor, a motion sensor, and an accelerometer.

In some embodiments, the mechanical substructure comprises a retention mechanism for securing the mechanical substructure and fillable jacket coupled thereto to the head of the subject. In some embodiments, the mechanical substructure includes a rigid frame. In some embodiments, the frame includes a locking hinge mechanism that allows the frame to be pushed toward the head of the subject to secure the frame snugly against the head of the subject.

Another aspect of the invention relates to a fillable jacket attachable to an inner surface of a cap supporting one or more ultrasound transducer elements. The fillable jacket comprises a deformable receptacle. The deformable receptacle holds a volume of an acoustic transmission fluid in a deformable chamber. The fillable jacket includes at least one port that is in fluid communication with an interior of the deformable chamber. A valve may be provided to control fluid flow through the port to thereby control the volume of the acoustic transmission fluid in the deformable chamber. The deformable jacket may be held in place in the cap with an O-ring. In some embodiments one or more of the valve and the O-ring are part of the fillable jacket.

In some embodiments, the fillable jacket comprises a sensor supported on or coupled to the deformable receptacle. The sensor may include a temperature sensor configured to measure a temperature of the acoustic transmission fluid in the deformable chamber and/or a temperature of the skin of a subject wearing a cap to which the fillable jacket is attached.

In some embodiments, the fillable jacket comprises one or more electrical conductors. The electrical conductors may, for example, be printed on an exterior surface of the deformable receptacle. The electrical conductors may be designed to make electrical connections to electrically conductive pads on the O-ring and/or in the cap when the fillable jacket is mounted to the cap by the O-ring. For example, the electrical conductors on the fillable jacket may contact corresponding conductive pads located on the O-ring. The O-ring may, in turn comprise electrical conductors that connect the conductive pads to segments of electrically conductive material that extend circumferentially around a part of the O-ring. The segments of electrically conductive material may provide electrical connections to conductors on the cap. In some embodiments the conductive pads are shaped to extend in a poloidal direction around part of the O-ring. In some embodiments the deformable receptacle is made of a disposable material. In some embodiments the deformable receptacle is made of a material having a modulus of elasticity in the range of 0.5 MPa to 10 MPa.

Another aspect of the invention relates to an ultrasound transducer assembly having one or more housings supported by the cap made of a rigid material. Each of the one or more housings comprises an ultrasound transducer element operable to deliver ultrasound energy, a spring coupled to the ultrasound transducer element, and a pivoted support coupled to the ultrasound transducer element. The spring exerts a reaction force directed to force the ultrasound transducer element along a first axis away from the housing when the ultrasound transducer element is moved toward the housing. The pivoted support facilitates rotational movement of the ultrasound transducer element around a second axis.

In some embodiments, the pivoted support comprises a gimbal arrangement for facilitating rotational movement of the ultrasound transducer element around the second axis and around a third axis. The first axis, the second axis, and the third axis may be mutually orthogonal. The gimbal arrangement may comprise a first ring coupled to the housing via a first rotary axle and a second ring coupled to the first ring via a second rotary axle.

In some embodiments, each of the one or more housings further comprises a first rotary encoder configured to measure a first angle of rotation relative to the second axis and a second rotary encoder configured to measure a second angle of rotation relative to the third axis. In some embodiments, each of the one or more housings further comprises a linear encoder configured to measure a displacement of the transducer element along the first axis.

Another aspect of the invention relates to an ultrasound transducer assembly comprising one or more housings coupled to a cap made of a flexible material. Each of the one or more housings comprises an ultrasound transducer element operable to deliver ultrasound energy, a localizer attached to the ultrasound transducer element, and a localization sensor. The localization sensor is configured to detect a position and an orientation of the localizer to determine a corresponding location and orientation of the ultrasound transducer element.

In some embodiments, the localizer comprises a reflective surface and the localization sensor comprises an infrared emitter, an infrared receiver, and a camera. In some embodiments, the localization sensor further comprises a light source for providing controlled lighting. In some embodiments, the localizer comprises a circular shaped reflective surface. In some embodiments, the cap is made of silicone. In some embodiments, the housings are attached to the cap via an adhesive. In other embodiments, the housings are coupled to corresponding grommets attached to the cap. The housings may be coupled to their corresponding grommets by threads.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention relates to ultrasound transducer assemblies that can be applied to deliver ultrasound energy to brain tissue and are compatible with different subjects (i.e. can accommodate different subjects with different head shapes and sizes). Such assemblies may be mounted on the heads of different subjects to deliver ultrasound energy to and/or receive echo ultrasound energy from brain tissue of the subjects. Since the shape and size of the head can vary from subject to subject, ultrasound transducer assemblies described herein include features that help achieve good coupling of ultrasound energy between transducer elements of the ultrasound transducer assembly and brain tissue of a subject.

First Example Embodiment

Figure 1:
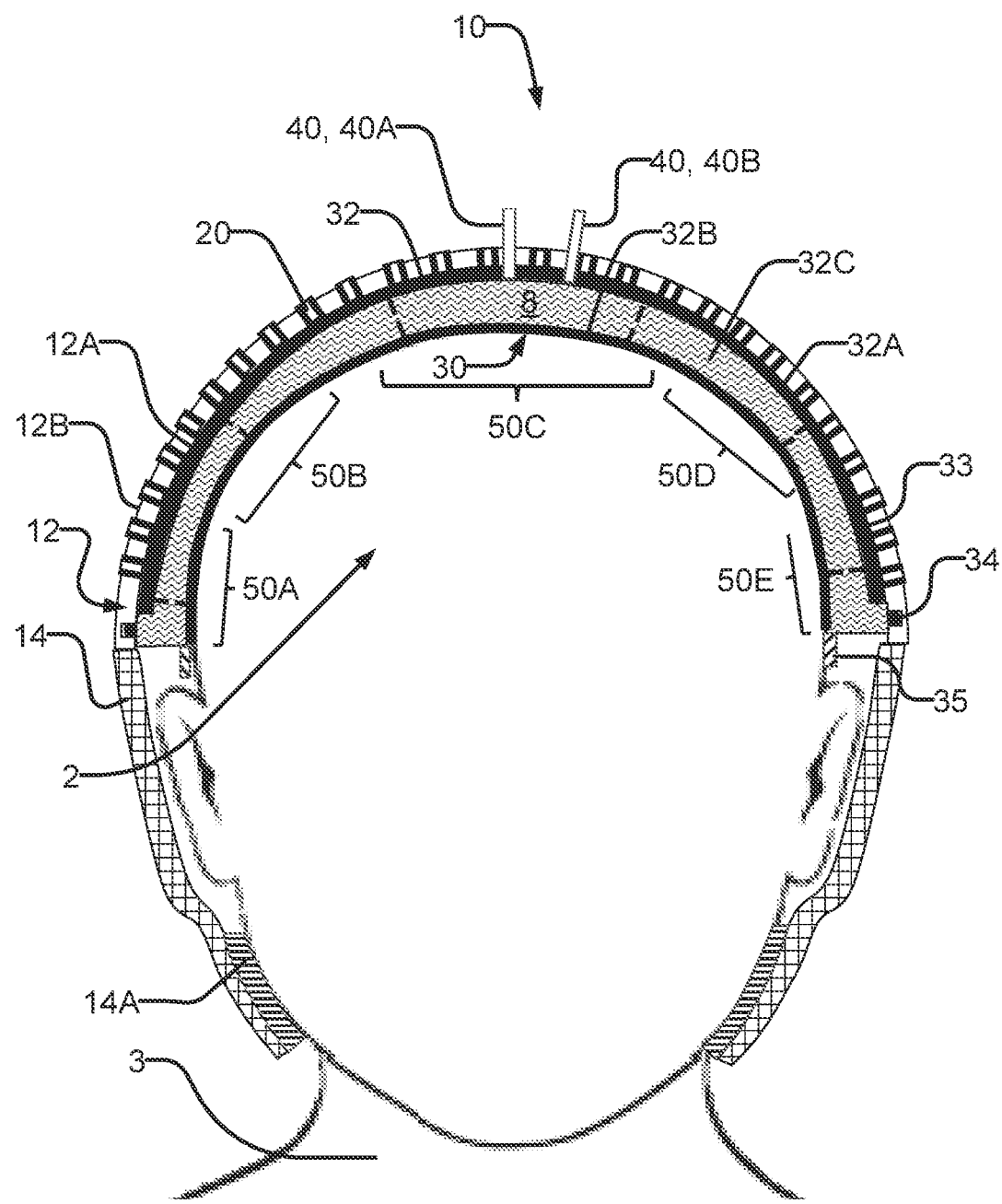
FIG. 1 schematically illustrates an ultrasound transducer assembly according to an example embodiment of the invention.
Figure 1A:
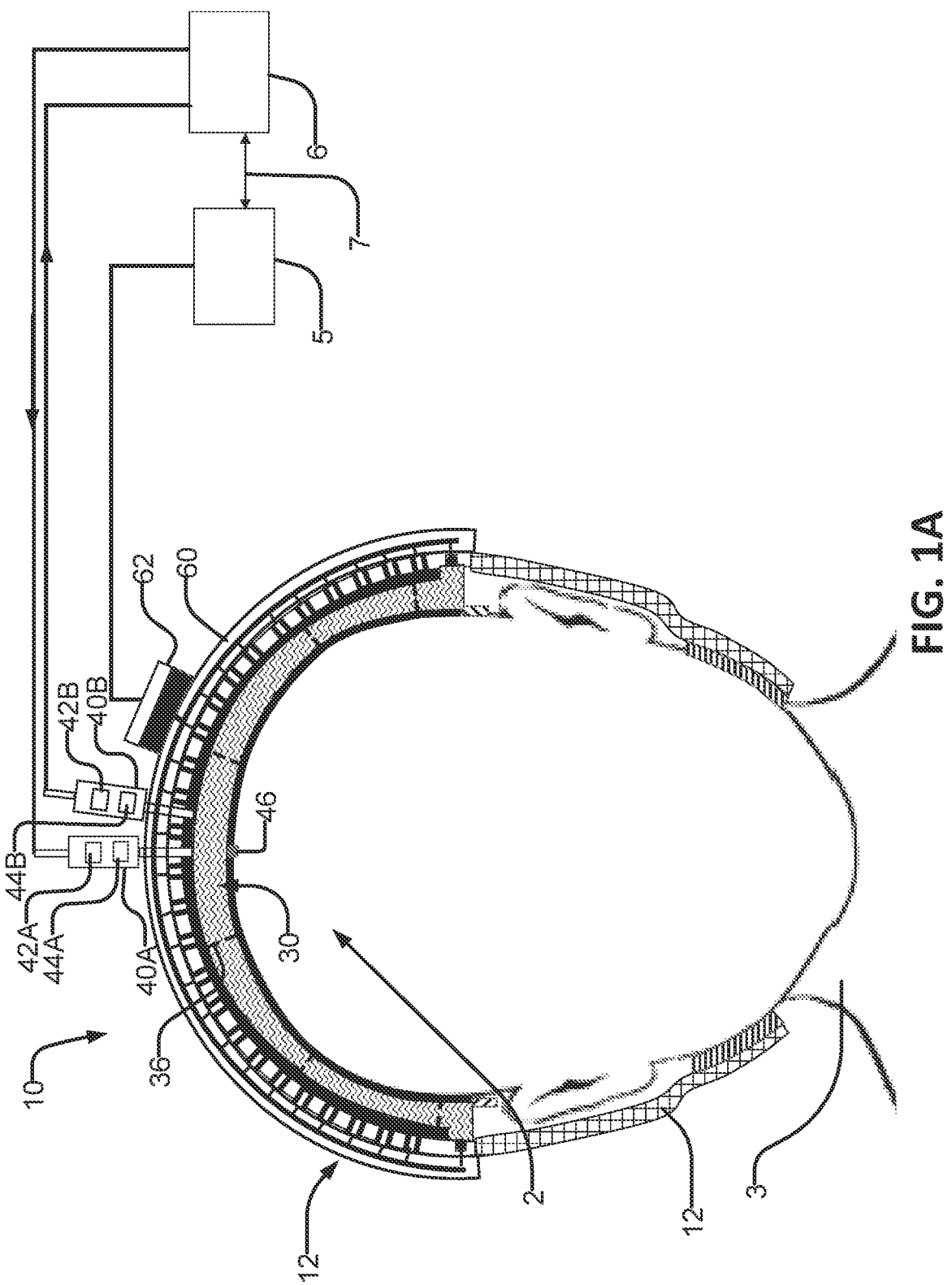
FIG. 1A shows the FIG. 1 ultrasound transducer assembly connected to an ultrasound system and a hydraulic system.

FIG. 1 schematically illustrates an ultrasound transducer assembly 10 according to an example embodiment. Assembly 10 is mounted on the head 2 of subject 3. Ultrasound transducer assembly 10 may be connected to an ultrasound system 5 and/or a hydraulic system 6 as shown in FIG. 1A. Ultrasound system 5 may, for example, be of the type described in PCT Publication No. WO2018/026738 titled ULTRASOUND GUIDED OPENING OF BLOOD-BRAIN BARRIER, which is hereby incorporated by reference herein in its entirety for all purposes.

Ultrasound transducer assembly 10 comprises a mechanical substructure 12 that supports one or more transducer elements 20. For example, mechanical substructure 12 may support about 256 to 1024 transducer elements 20. When ultrasound transducer assembly 10 is mounted on head 2 of subject 3, transducer elements 20 may be operated independently or collectively to deliver ultrasound energy to brain tissue of subject 3 and/or to receive echo ultrasound energy. That is, some transducer elements 20 may be operated to deliver but not receive ultrasound energy, while some other transducer elements 20 may be operated to receive but not deliver ultrasound energy. Some other transducer elements 20 may be operated to deliver and to receive ultrasound energy. These various modes of operation of the transducer elements 20 may be applied to enable any of therapy, imaging, or monitoring as well as combinations of two or more of these.

Transducer elements 20 may be operated to transmit or receive ultrasound energy having various frequencies and/or frequency ranges. For example, some transducer elements may be operated to deliver low frequency ultrasound energy (e.g. about 200 kHz to 400 kHz). As another example, some transducer elements 20 may be operated to deliver and to receive low frequency ultrasound energy. As another example, some transducer elements 20 may be operated to deliver and to receive high frequency ultrasound energy (e.g. 2 MHz or more). As another example, some transducer elements 20 may be operated to receive both low frequency and high frequency ultrasound energy.

In some embodiments, ultrasound transducer assembly 10 is connected to and receives signals from ultrasound system 5 to operate transducer elements 20.

In some embodiments, each of transducer elements 20 is supported by or housed in an independent housing of mechanical substructure 12 as depicted in FIG. 1.

Mechanical substructure 12 has an inner surface 12A and an outer surface 12B. Inner surface 12A is shaped to define a cavity 16 for receiving head 2 of subject 3 (see FIG. 1B). Although not necessary, mechanical substructure 12 typically has an overall configuration of a cap or helmet. Accordingly, mechanical substructure 12 may be described or referred to herein as a cap or a helmet for brevity.

Mechanical substructure 12 is made of a rigid material and/or coupled to a rigid frame 14. Frame 14 may be integrally formed with or detachably coupled to mechanical substructure 12 (e.g. by snap fit mechanisms, hinges, etc.). Frame 14 may include a locking hinge mechanism that helps secure mechanical substructure 12 to head 2 of subject 3. For example, frame 14 may include a locking hinge mechanism that allows frame 14 to be pushed toward head 2 and locked in place to secure frame 14 snugly against the face of subject 3. When locked in place, frame 14 applies pressure on the bony areas (e.g. areas below the temples) of the face of subject 3 to constrain movement of ultrasound transducer assembly 10 relative to head 2.

Figure 1B:
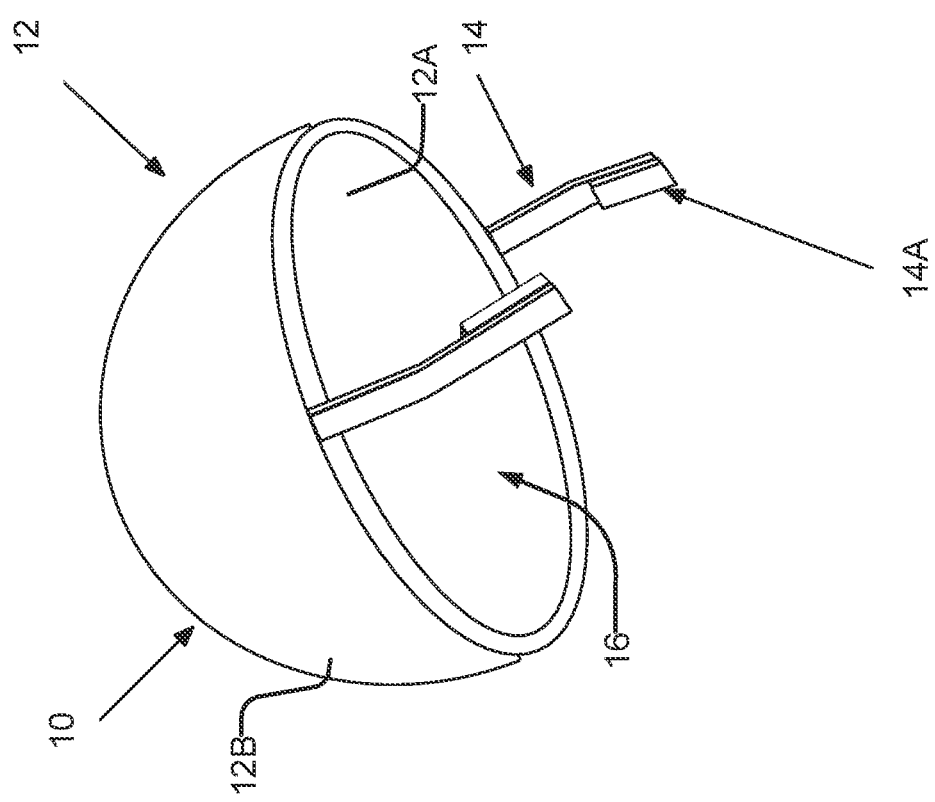
FIG. 1B is a perspective view of an ultrasound transducer assembly of the type shown in FIG. 1.

In some embodiments, frame 14 comprises padding 14A coupled to a section of an inside surface of frame 14 (see FIG. 1B). Padding 14A can provide more comfort to subject 3 when frame 14 is pressed against the face of subject 3.

Fillable Jacket

Ultrasound transducer assembly 10 comprises a fillable jacket 30 that is coupled to the inner surface 12A of mechanical substructure 12. Jacket 30 is located in cavity 16 and between mechanical substructure 12 and head 2 when ultrasound transducer assembly 10 is mounted on head 2. Jacket 30 may be shaped with an outer surface shaped to fit against inner surface 12A of mechanical substructure 12 and an inner surface shaped to receive head 2 of a subject.

Jacket 30 is acoustically coupled to transducer elements 20. In some embodiments, jacket 30 is in direct physical contact with transducer elements 30. Jacket 30 includes one or more chambers that can contain an acoustic transmission fluid 8. Acoustic transmission fluid 8 can provide a good acoustic coupling medium between transducer elements 20 and head 2 (e.g. by removing or reducing air gaps between transducer elements 20 and head 2). Examples of suitable acoustic transmission fluids 8 include, but are not limited to, water, mineral oil, and gel. The following properties of acoustic transmission fluid 8 may be similar to those of the tissue of head 2: attenuation coefficient, reflection coefficient, transmission coefficient and/or acoustic impedance.

When filled with acoustic transmission fluid 8, jacket 30 expands to contact and apply pressure on head 2. This may provide good acoustic contact between transducer elements 20 and head 2 as well as further constraining movement of ultrasound transducer assembly 10 relative to head 2. Ultrasound transducer assembly 10 may be fit to heads 2 of different sizes by filling fillable jacket 30 with appropriate amounts of acoustic transmission fluid 8.

In some embodiments, jacket 30 can be expanded (i.e. filled with acoustic transmission fluid 8) until it conforms to the shape and/or contours of head 2. This facilitates good coupling of ultrasound energy between transducer elements 20 of the ultrasound transducer assembly and brain tissue of subject 3. It may be particularly desirable in some cases to establish conformability and good acoustic coupling between transducer elements 20 and the cranium of head 2. This allows ultrasound energy to reach and propagate to and within the four lobes (frontal, parietal, temporal and occipital), the cerebellum and the brain stem. Accordingly, jacket may be shaped or otherwise designed to provide good conformability between transducer elements 20 and the cranium of head 2 when jacket 30 is filled with acoustic transmission fluid 8.

In the example embodiment depicted in FIG. 1, jacket 30 comprises a deformable receptacle 32 that defines a deformable chamber 32C therein. Deformable receptacle 32 has an outer surface 32A facing toward mechanical substructure 12 and an inner surface 32B facing away from mechanical substructure 12 (i.e. facing toward cavity 16). Deformable receptacle 32 may be made of a material or combination of materials such as polyurethane, latex, silicone, or the like that seal chamber 32C against loss of fluid 8 and has good acoustic transmission properties. The material making up at least inner surface 32B of receptacle 32 may be elastic to allow receptacle 32 to expand or contract to accommodate heads of different sizes but without forming significant amounts of creases.

Jacket 30 may include several regions 50A, 50B, 50C, 50D, 50E as shown in FIG. 1. The material properties (e.g. thickness, stiffness, elasticity, etc.) of certain parts of deformable receptacle 32 may vary between different regions 50. For example, inner surface 32B of deformable receptacle 32 may be thinner at region 50C compared to region 50A or region 50E. For example, inner surface 32B may have a material thickness in the range of about 1-2 mm thick at region 50C and about 3-4 mm at regions 50A, 50E. As another example, the elasticity of different regions 50 of jacket 30 may range from 0.5 MPa to 10 MPa, including any value therebetween.

Deformable chamber 32C may be filled with a volume of acoustic transmission fluid 8 (e.g. water, mineral oil, gel, etc.).

In some embodiments, deformable chamber 32C is pre-filled with a desirable volume of acoustic transmission fluid 8. That is, deformable chamber 32C may be filled with acoustic transmission fluid 8 before jacket 30 is mechanically coupled to mechanical substructure 12 and/or before assembly 10 is mounted on the head 2 of subject 3. In such embodiments, jacket may include a system for adjusting the amount of acoustic transmission fluid 8 contained in a part of jacket 30 between mechanical substructure 12 and head 2 so that the ultrasound transducer assembly 10 fits to the head 2 of a subject. Such a system may comprise a port 40 that allows acoustic transmission fluid 8 to escape from deformable chamber 32C as ultrasound transducer assembly 10 is placed over a person's head 2. In a simple embodiment port 40 is connected to a one-way valve in fluid communication with deformable chamber 32C. The one-way valve allows acoustic transmission fluid 8 to exit from deformable chamber 32C. For example, deformable chamber 32C may be pre-filled with an excess amount of acoustic transmission fluid 8 and the excess amount of acoustic transmission fluid 8 may be withdrawn from deformable chamber 32C through the one-way valve upon ultrasound transducer assembly 10 being fitted to a subject's head 2 (i.e. the excess amount of acoustic transmission fluid 8 may be withdrawn from deformable chamber 32C due to forces exerted by head 2).

In another example embodiment an accumulator is connected to a port that allows acoustic transmission fluid 8 to escape from deformable chamber 32C. The accumulator may receive acoustic transmission fluid displaced from deformable chamber 32C and may exert a mild pressure on the displaced acoustic transmission fluid 8, thereby keeping fillable jacket expanded to contact head 2. Acoustic transmission fluid 8 may flow back and forth between the accumulator and deformable chamber 32C as ultrasound transducer assembly 10 is fitted to a head 10.

In other embodiments, deformable chamber 32C is kept empty or is only partially filled before jacket 30 is mechanically coupled to mechanical substructure 12 and/or before assembly 10 is mounted on the head 2 of subject 3. In such embodiments, deformable chamber 32C may be filled with more acoustic transmission fluid 8 after assembly 10 is mounted on the head 2 of subject 3 (e.g. by pumping fluid 8 through one or more ports 40 as described in more detail below). For example, deformable chamber 32C may be filled with more acoustic transmission fluid 8 and expanded until deformable receptacle 32 conforms to the shape and/or contours of the head 2 of the subject 3.

In some embodiments, hydraulic system 6 is connected to ultrasound transducer assembly 10 and is operable to pump acoustic transmission fluid 8 into deformable chamber 32C and/or to withdraw acoustic transmission fluid 8 from deformable chamber 32C. Hydraulic system 6 may include active hydraulic systems (e.g. systems that are electrically operated or manually operated) and/or non-active components. In some embodiments, hydraulic system 6 comprises a catchment bag (e.g. for receiving excess fluid 8 flowing out of deformable chamber 32C) and, optionally, a reservoir bag (e.g. for providing additional fluid 8 to deformable chamber 32C). In some embodiments, hydraulic system 6 comprises active devices such as pumps, computers, controllers, and/or the like.

Outer surface 32A of deformable receptacle 32 is acoustically coupled to transducer elements 20. For the purposes of facilitating the description, two elements (e.g. transducer element 20 and head 2) are "acoustically coupled" if about 80% or more of the ultrasound power is transmitted from the first element to the second element.

Outer surface 32A of deformable receptacle 32 may be acoustically coupled to mechanical substructure 12 (in particular to transducers 20) through a layer of acoustic coupling gel 33 (e.g. Aquasonic™ gel, Bolx™ gel, etc.) located between outer surface 32A and inner surface 12A of mechanical substructure 12.

Jacket 30 may be mechanically coupled to mechanical substructure 12 through a variety of different mechanisms. For example, jacket 30 may be integrally formed with mechanical substructure 12. As another example, outer surface 32A of deformable receptacle 32 may be adhered to inner surface 12A of mechanical substructure 12 using an adhesive.

In the example embodiment shown in FIG. 1, jacket 30 comprises an O-ring 34 that may be pressed or otherwise inserted into a circumferentially extending channel 15 of mechanical substructure 12. Inserting O-ring 34 into channel 15 mechanically couples jacket 30 to mechanical substructure 12 (e.g. see FIG. 1C). Advantageously, O-ring 34 may fit snugly in channel 15 to provide a seal that holds acoustic coupling gel 33 between inner surface 12A of mechanical substructure 12 and outer surface 32A of deformable receptacle 32. That is, O-ring 34 may fit snugly in channel 15 to prevent acoustic coupling gel 33 from leaking. In some embodiments O-ring 34 is integrated with fillable jacket 30 (e.g. see FIG. 1C). In some embodiments O-ring 34 is a separate part that holds an edge of fillable jacket 30 in channel 15.

In some embodiments, jacket 30 is detachable from mechanical substructure 12. For example, jacket 30 may be detached from mechanical structure 12 by pulling O-ring 34 out of channel 15. In these embodiments, jacket 30 and the components thereof may be made of disposable materials. Different jackets 30 may be used for different subjects. In some embodiments, a set of different jackets 30 may be provided in which the different jackets 30 have different volumes, larger volumes to accommodate smaller heads or smaller volumes to accommodate larger heads.

Jacket 30 may include a locking mechanism for securing jacket 30 to the head 2 of subject 3. For example, jacket 30 may include an elastic band 35 extending around inner surface 32B of deformable receptacle 32 as shown in FIG. 1. Elastic band 35 may be formed or fused with deformable receptacle 32. Advantageously, elastic band 35 may be secured around the head 2 of subject 3 to discourage any acoustic coupling gel 33 applied between head 2 and the inner surface 32B of deformable receptacle 32 from leaking out.

Although not mandatory, jacket 30 typically comprises one or more ports 40 (i.e. openings) in fluid communication with deformable chamber 32C. Ports 40 may be physically supported by mechanical substructure 12. For example, ports 40 may project out through openings located on mechanical substructure 12 as shown in FIG. 1. Advantageously, ports 40 allow acoustic transmission fluid 8 to be pumped into and/or withdrawn from deformable chamber 32C to control the volume of deformable receptacle 32.

Hydraulic system 6 may be connected to ports 40 and operated to pump acoustic transmission fluid 8 into deformable chamber 32C and/or to withdraw acoustic transmission fluid 8 from deformable chamber 32C. In the example embodiment shown in FIG. 1A, jacket 30 comprises an inlet port 40A connectable to hydraulic system 6 for receiving acoustic transmission fluid 8 and an outlet port 40B connected to hydraulic system 6 for extracting acoustic transmission fluid 8 from deformable chamber 32C. Ports 40 may be in fluid communication with hydraulic system 6 through one or more flexible tubes or the like.

Ports 40 may comprise or may otherwise be in fluid communication with one or more valves 42. Valves 42 may be switched between an OPEN position that permits fluid flow therethrough and a CLOSED position that prevents fluid flow therethrough. In the example embodiment shown in FIG. 1A, inlet valve 42A may be switched to its OPEN position and outlet valve 42B may be switched to its CLOSED position to allow hydraulic system 6 to pump acoustic transmission fluid 8 into deformable chamber 32C.

That is, outlet valve 42B may be switched to its CLOSED position after a flow between inlet valve 42A and outlet valve 42B is established to fill deformable chamber 32C with acoustic transmission fluid 8.

Similarly, inlet valve 42A may be switched to its CLOSED position and outlet valve 42B may be switched to its OPEN position to allow hydraulic system 6 to withdraw acoustic transmission fluid 8 from deformable chamber 32C.

In some embodiments, valve 42 is an electrically operated control valve and/or comprises suitable electronics for receiving an electronics signal to control valve 42. In these embodiments, valve 42 may be electrically connected to a control system provided as part of hydraulic system 6 and/or an external control system (not shown) to receive an electronics signal that controls valve 42. Valve 42 may be electrically connected to hydraulic system 6 and/or another control system by way of electrical cables or the like.

Valves 42 may be operated to control the pressure inside deformable receptacle 32. For example, valves 42 may be operated to maintain the pressure inside deformable chamber 32C at a level that provides good acoustic coupling between transducer elements 20 and tissue inside head 2 and comfortable for subject 3. In some embodiments, the pressure inside deformable receptacle 32 is maintained between 1 to 3 atmospheric pressure.

To determine if deformable chamber 32C has expanded enough to fill the space between head 2 and the inner surface 12A of the transducer assembly 10, one or more transducer elements 20 may be operated to deliver and receive a pulse of ultrasound energy. If the transducer element 20 detects a strong reflection immediately upon launching a pulse, this indicates that an air gap exists between inner surface 12A and deformable receptacle 32. In such cases, valves 42 may be operated to increase the pressure inside deformable receptacle 32 until the strength of the immediate reflection is reduced. Ultrasound system 5 may be connected to transducer assembly 10 to coordinate the pulse-echo integration and the increase in pressure inside deformable receptacle 32. For example, the pressure inside of deformable receptacle 32 may be increased incrementally in steps with a pulse-echo measurement done at each step. In some embodiments, ultrasound system 5 is configured to set a maximum pressure value to prevent the pressure inside of deformable receptacle 32 from exceeding the maximum pressure value.

Jacket 30 optionally includes one or more baffles 36 located in deformable chamber 32C. Advantageously, baffles 36 can provide a more even distribution of the volume of acoustic transmission fluid 8 within deformable chamber 32 by preventing acoustic transmission fluid 8 from flowing freely to certain areas. For example, baffles 36 may be arranged to reduce pooling of acoustic transmission fluid 8 at the bottom of deformable chamber 32C (e.g. due to gravity) when subject 3 puts on ultrasound transducer assembly 10. Such pooling could undesirably cause air pockets to form at the top of deformable chamber 32C.

In some embodiments, baffles 36 include one or more features that help to prevent pooling. For example, baffles 36 may be constructed to limit separation of inner surface 32B from outer surface 32A. Baffles 36 may be made of a low elasticity or a non-elastic material and may be physically coupled to outer surface 32A and inner surface 32B via an adhesive. As chamber 32C becomes full, baffles 36 may apply forces that prevent outer surface 32A and inner surface 32B from separating by more than a certain distance to discourage deformable chamber 32C from bulging excessively.

Baffles 36 may be made of materials that have acoustic impedance that is the same as or close to matching the acoustic impedance of acoustic transmission fluid 8 so that baffles 36 are acoustically transparent or nearly so. For example, baffles 36 may be made of silicone with an acoustic impedance of about 1.54 MRayl and acoustic transmission fluid 8 may be water with an acoustic impedance of about 1.48 MRayl.

Preferably, the thickness of baffles 36 is significantly less than the wavelength of ultrasound emitted by transducer elements 20 in acoustic transmission fluid 8. For example, baffles 36 may have a thickness of approximately 1 mm or less where transducer elements 20 are configured to deliver ultrasound having frequencies up to about 220 KHz and acoustic transmission fluid 8 is water or another fluid in which the speed of sound is close to the speed of sound in water.

In some embodiments, baffles 36 are constructed to extend between outer surface 32A and inner surface 32B. Baffles 36 may be constructed to leave perforations 37 (e.g. gaps between baffle 36 and outer surface 32B) as shown in FIG. 1D. Perforations 37 allow some flow of acoustic transmission fluid 8 past baffle 36. Perforations 37 can reduce the likelihood of air bubbles forming at the junctions of baffles 36 and deformable receptacle 32.

Supplementary Features of First Example Embodiment

Ultrasound transducer assembly 10 optionally comprises one or more sensors 44 (e.g. electronic water pressure sensors, flow sensors, temperature sensors, etc.) configured to measure flow and/or pressure characteristics of acoustic transmission fluid 8. Sensors 44 may be located between ports 40 and hydraulic system 6 as depicted in FIG. 1A. Sensors 44 may be electrically connected to a control system provided as part of hydraulic system 6 and/or an external control system (not shown). The control system may control sensors 44, provide power to sensors 44, read output signals of sensors 44, process sensor values, etc.

The control system may be connected to or may be provided as part of hydraulic system 6 and/or ultrasound system 5. For example, hydraulic system 6 may comprise the control system and may be connected to ultrasound system 5 by way of a system interface 7 as shown in FIG. 1A.

FIG. 1A illustrates one exemplary way of electrically connecting ultrasound transducer assembly 10 to ultrasound system 5. As shown in FIG. 1A, ultrasound transducer assembly 10 includes a cable housing layer 60 that houses wires connected to transducer elements 20 and, optionally, wires that that connect to sensors 44, 46 as described in more detail elsewhere herein. The wires may be bundled or individually routed through cable housing layer 60 to a connector 62. Electrical connection between transducer elements 20 and ultrasound system 5 may be made through a detachable cable connector that mates with connector 62. Cable housing layer 60 may include mechanical structures such as pillars (not shown) to provide mechanical support to cable housing layer 60. These pillars may extend from mechanical substructure 12 to the top of cable housing layer 60. In some embodiments, flex circuits are used to connect connector 62 with transducer elements 20.

Some embodiments apply one or more of various methods for controlling flow of acoustic transmission fluid 8 into and/or out of deformable chamber 32C as transducer elements 20 are operated to deliver ultrasound energy to head 2 of subject 3. Ultrasound system 5, hydraulic system 6, and ultrasound transducer assembly 10 may, for example, be operated in the following non-limiting ways:

hydraulic system 6 may comprise electronics that receive signals from valves 42, sensors 44 and/or external control systems and transmit corresponding signals to ultrasound system 5 (e.g. by way of system interface 7) to start and stop ultrasonic transmission, modulate the timing of certain aspects of ultrasonic transmission (e.g. the timing between transmit pulses), etc.

hydraulic system 6 may be controlled manually or automatically to modulate the flow of fluid 8 to and from jacket 30 and/or the pressure within deformable chamber 32C.

hydraulic system 6 may pump acoustic transmission fluid 8 into deformable chamber 32C and stop pumping upon sensors 44 detecting a threshold pressure that corresponds to head 2 being constrained by jacket 30.

hydraulic system 6 may continually flow acoustic transmission fluid 8 (e.g. degassed water) through deformable chamber 32C. This may reduce the likelihood that air bubbles will accumulate inside jacket 30. Circulating fluid 8 may help cool transducer elements 20. In some embodiments hydraulic system 6 continuously delivers fluid 8 into deformable chamber 32C and regulates pressure within chamber 32C by one or more of modulating the rate of flow of fluid 8 into chamber 32C and adjusting a valve connected to regulate flow of fluid 8 out of deformable chamber 32C.

Ultrasound transducer assembly 10 may also optionally comprise one or more temperature sensors 46. Temperature sensors 46 may, for example, comprise thermistors, thermocouples or other suitable temperature sensors. Temperature sensors 46 may for example, be placed and configured to measure the temperature of acoustic transmission fluid 8 at one or more of:

locations near head 2;
locations near transducer elements 20;
an exit port of chamber 32C;
an inlet port of chamber 32C;
a top of chamber 32C.

In some embodiments, fillable jacket 30 comprises one or more temperature sensors 46. The temperature sensors 46 may be located on the outside of inner surface 32B of deformable receptacle 32 (i.e. between deformable receptacle 32 and head 2). When ultrasound transducer assembly 10 is connected to ultrasound system 5, temperature sensors 46 may transmit sensor readings to ultrasound system 5. This allows ultrasound system 5 to control transducer elements 20 (e.g. cease ultrasound energy transmission) based on the measurements of temperature sensors 46. For example, transducer elements 20 may be controlled to deliver ultrasound energy until temperature sensors 46 measure a threshold temperature. In some embodiments, temperature sensors 46 are oriented to estimate the skin temperature of subject 3. In such embodiments, the threshold temperature may be set to a value between, for example, 40° C. to 43° C. to prevent discomfort to subject 3.

In some embodiments, temperature sensors 46 are configured to measure the temperature of acoustic transmission fluid 8. In these embodiments, the temperature measured by temperature sensors 46 may be transmitted to hydraulic system 6 (e.g. through ultrasound system 5 and system interface 7). Hydraulic system 6 may be configured to control the flow rate and/or the temperature of acoustic transmission fluid 8 flowing into jacket 30 based on the temperature measurements.

In some embodiments, hydraulic system 6 comprises a temperature control system operable to adjust a temperature of fluid 8 being delivered to jacket 30. The temperature control system may include a heater and/or a cooler. In some embodiments, the temperature of acoustic transmission fluid 8 is maintained in the range of about 35° C. to 40° C.

In some embodiments, some or all of temperature sensors 46 are interconnected to other systems (e.g. ultrasound system 5, hydraulic system 6, etc.) by electrical conductors 47 that are supported on inner surface 32B of deformable receptacle 32. For example, the electrical conductors may be formed by printing using electrically conductive ink. Electrical conductors 47 may, for example be printed or otherwise provided on the outside of inner surface 32B of deformable receptacle 32 (see FIG. 1C). Electrical conductors 47 may provide electrical connections of sensors of fillable jacket 30 (e.g. temperature sensors 46) to external systems (e.g. ultrasound system 5).

For example, electrical conductors 47 may carry signals to electrical conductors supported on mechanical substructure 12 to allow temperature sensors 46 to receive signals from and/or transmit signals to ultrasound system 5. For example, electrical conductors 47 may carry electrical currents to and from sensors 46. The electrical current may power temperature sensors 46 (and/or other sensors) and/or transmit data to ultrasound system 5 (or another system external to jacket 30) in analog and/or digital form.

In some embodiments ultrasound system 5 is configured to modulate an ultrasound transmit firing sequence and/or control other operations of ultrasound system 5 based on data received from temperature sensors 46. For example, if temperature sensors 46 detect a temperature value above a threshold value, transmission of ultrasound energy may be paused until temperature sensors 46 detect a lower (pre-set) temperature value.

Figure 1C:
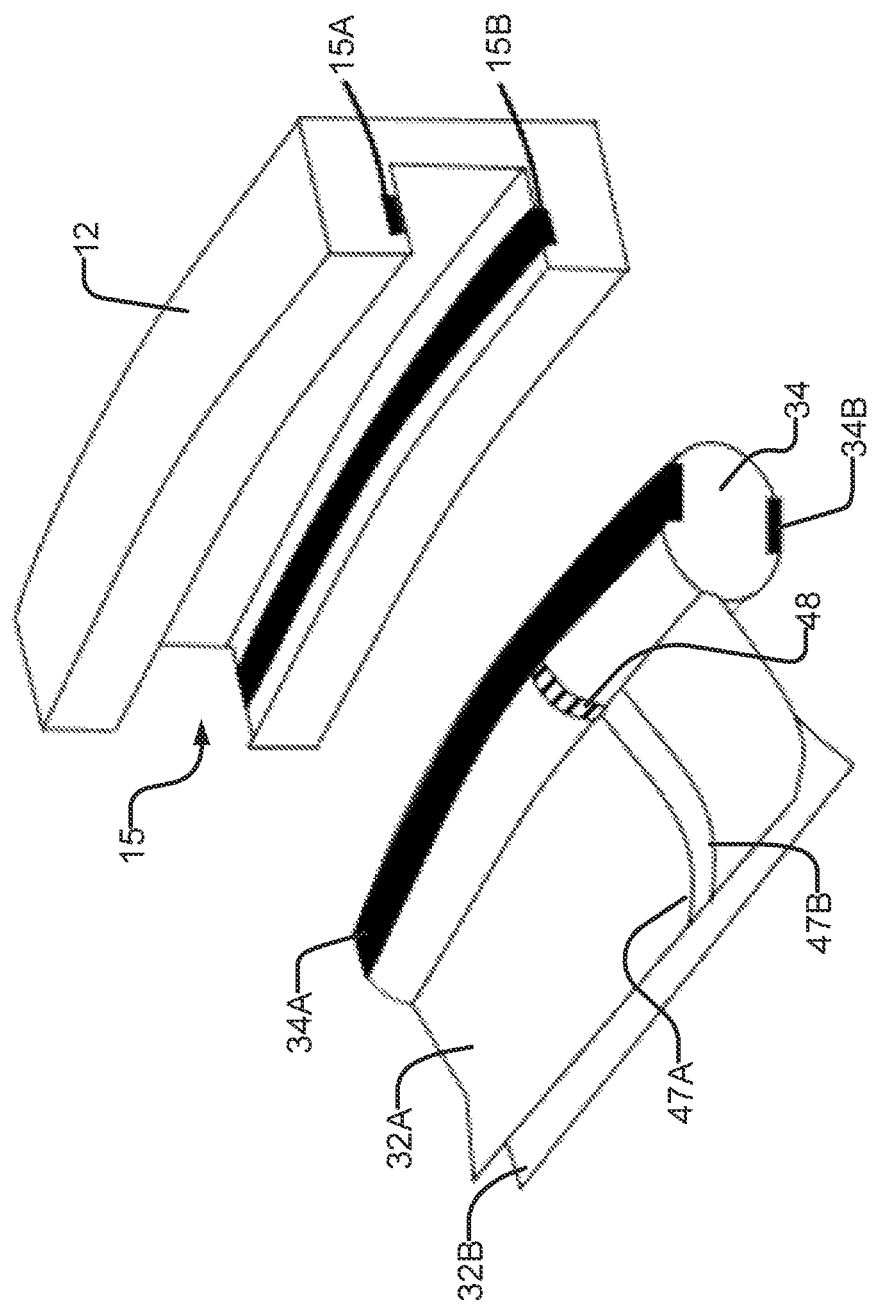
FIG. 1C is an exploded perspective view of a section of the FIG. 1 ultrasound transducer assembly.
Figure 1D:
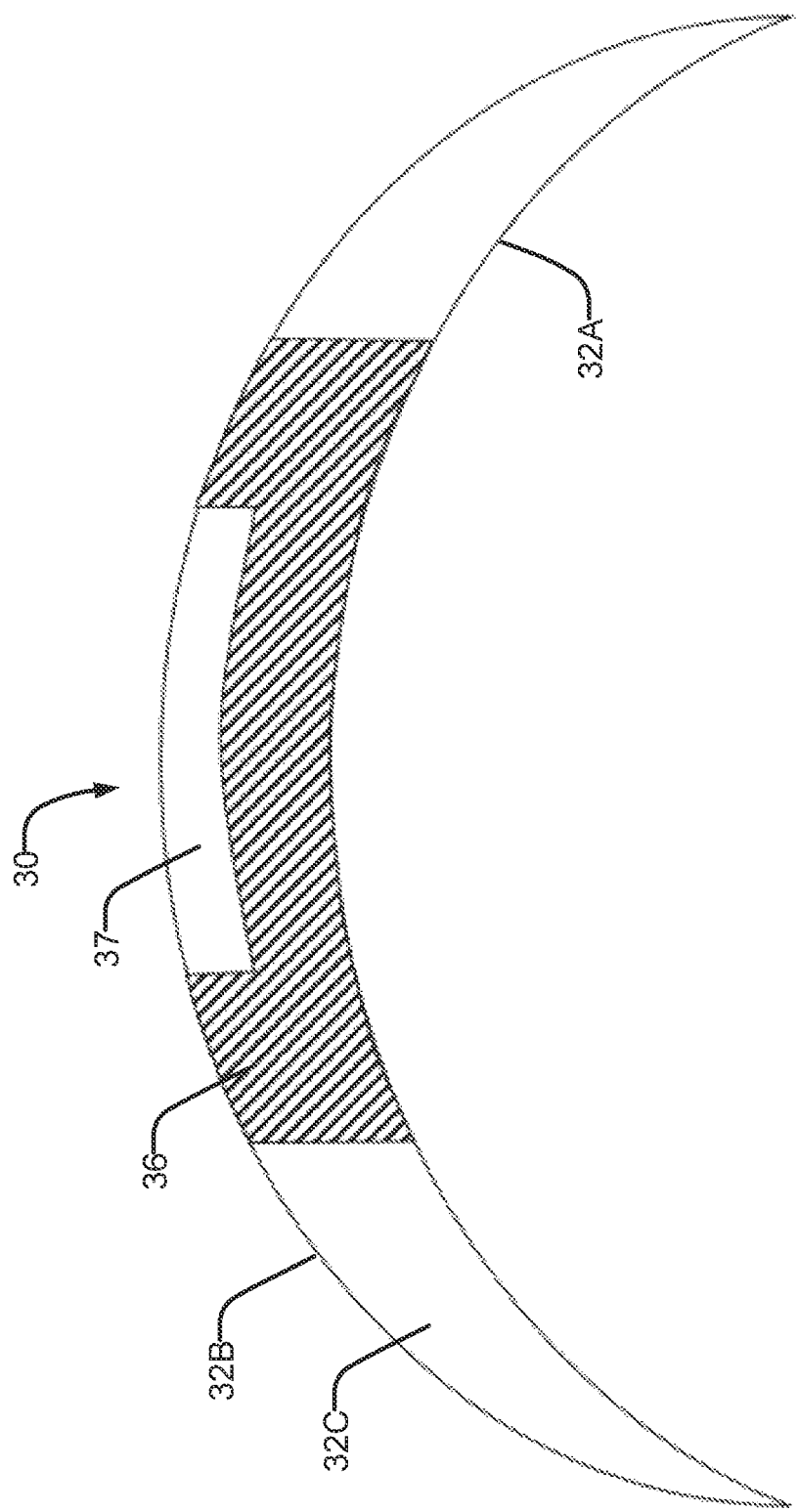
FIG. 1D schematically illustrates a baffle which may be provided as part of the FIG. 1 ultrasound transducer assembly.

In the example embodiment shown in FIG. 1C, electrical conductors 47A, 47B are electrically connected to metallic strips 34A, 34B by way of conductive pads 48 located on O-ring 34. Conductive pads 48 may be shaped to extend in a poloidal direction around parts of O-ring 34. Typically, at least part of the conductive pads 48 is oriented to face toward deformable receptacle 32 (i.e. face in a radial direction) as shown in FIG. 1C.

O-ring 34 may comprise first and second conductive pads 48 electrically connected to corresponding first and second electrical conductors 47A, 47B. In the example embodiment shown in FIG. 1C, first electrical conductor 47A is electrically connected to first electrically conductive (e.g. metallic) strip 34A through first conducting pad 48, while second electrical conductor 47B is electrically connected to second electrically conductive strip 34B through a second electrically conducting pad (not shown).

First strip 34A and second strip 34B are electrically isolated from each other. First strip 34A may, for example, carry a signal current to and/or from sensor 46. Second strip 34B may, for example, be connected to an electrical ground.

Like O-ring 34, strips 34A, 34B may extend circumferentially around deformable receptacle 32. When O-ring 34 is inserted into channel 15 of mechanical substructure 12, strips 34A, 34B of O-ring 34 contact corresponding electrically conductive strips 15A, 15B located in channel 15. Strips 15A, 15B may extend circumferentially around channel 15.

In embodiments where fillable jacket 30 comprises plural sensors (e.g. several temperature sensors 46), strips 34A, 34B of O-ring 34 and strips 15A, 15B located in channel may be discontinuous (i.e. they may be broken into sections with each section electrically isolated from other ones of the sections).

Ultrasound transducer assembly 10 may include a wide range of variations and/or supplementary features. These variations and/or supplementary features may be applied to all of the embodiments of ultrasound transducer assembly 10 described above, as suited, and include, without limitation:

inner surface 32B of deformable receptacle 32 (i.e. the surface of jacket 30 located adjacent to head 2 of subject 3 when ultrasound transducer assembly 10 is mounted on head 2 of subject 3) may be coated with a layer of an acoustic coupling material such as a gel 33. That is, a layer of acoustic coupling gel 33 may be applied between inner surface 32B of deformable receptacle 32 and head 2 of subject 3.

Ultrasound transducer assembly 10 may include an air bubble detector (e.g. a transducer element 20 configured to detect air bubbles) that detects the presence of air bubbles in jacket 30. Hydraulic system 6 and/or ultrasound transducer assembly 10 may be configured to remove any detected air bubbles from jacket 30 (e.g. by emptying and refilling deformable chamber 32C and/or by increasing the flow rate of acoustic transmission fluid 8 into deformable chamber 32, etc.).

Ultrasound transducer assembly 10 may include other sensors including but not limited to EEG sensors, motion sensors and accelerometers. Such sensors may be used to, for example, modulate the ultrasound energy delivered by ultrasound transducer assembly 10.

Figure 1E:
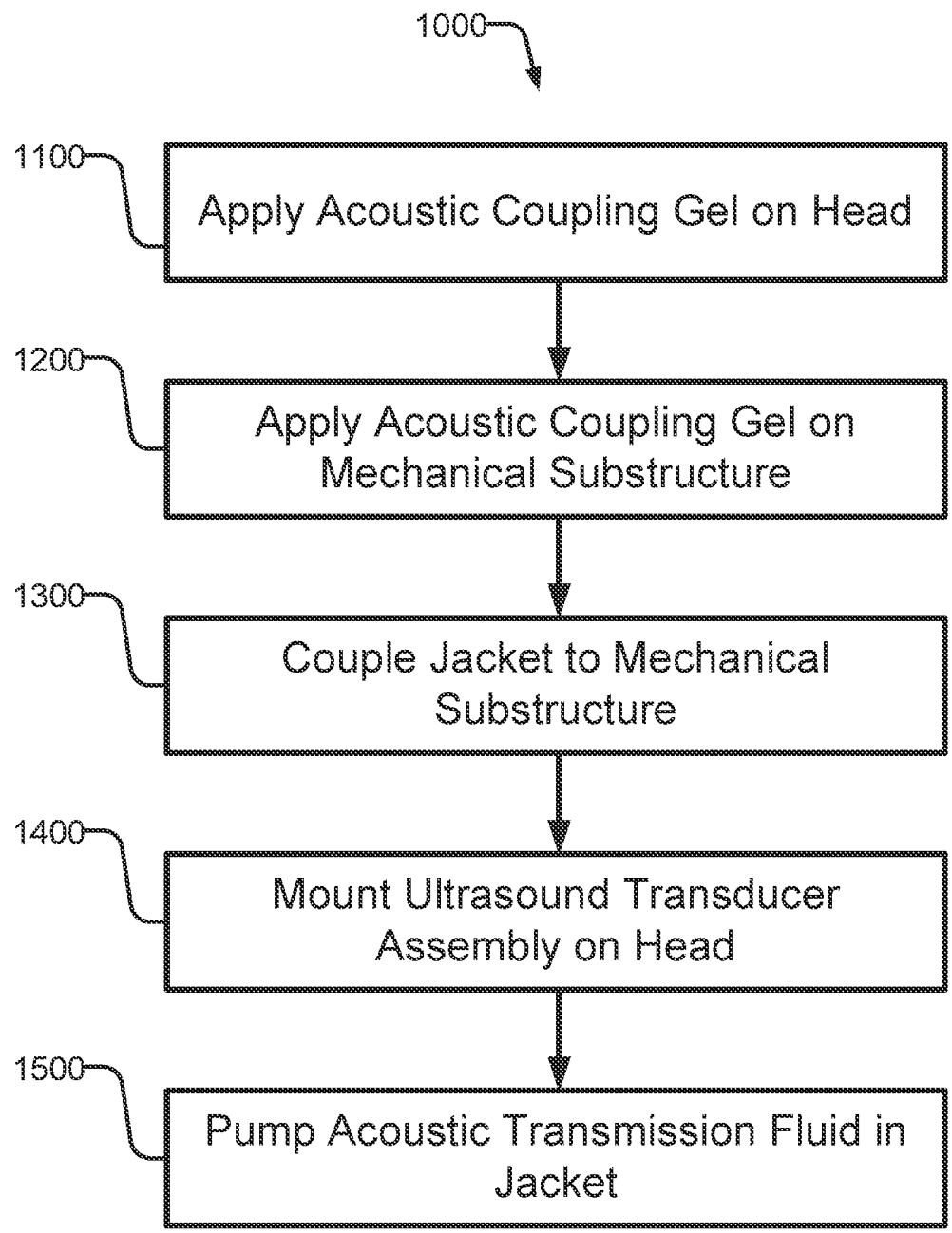
FIG. 1E illustrates a flow chart illustrating a method for assembling and mounting the FIG. 1 ultrasound transducer assembly on the head of a subject.

FIG. 1E is a flow chart that illustrates an exemplary method 1000 for assembling and mounting ultrasound transducer assembly 10 on the head 2 of subject 3. At step 1100, acoustic coupling gel 33 is applied to head 2. At step 1200, acoustic coupling gel 33 is applied to the inner surface 12A of mechanical substructure 12. Step 1200 may occur before, after, or at the same time as step 1100.

At step 1300, jacket 30 is mechanically coupled to mechanical substructure 12. For example, step 1300 may comprise inserting O-ring 34 of jacket 30 into channel 15 of mechanical substructure 12. Step 1300 may comprise mechanically coupling jacket 30 to mechanical substructure 12 in a way that causes valves 42 to project out of and through mechanical substructure 12. Step 1300 may be performed before, during or after step 1200.

After mechanically coupling jacket 30 to mechanical substructure 12, ultrasound transducer assembly 10 is mounted on head 2 of subject 3 at step 1400. Step 1400 may comprise pressing frame 14 against the face of subject 3 to secure ultrasound transducer assembly 10 in place. At step 1500, hydraulic system 6 is connected to ultrasound transducer assembly 10 (i.e. through ports 40) and pumps acoustic transmission fluid 8 into jacket 30. When jacket 30 is filled with acoustic transmission fluid 8, jacket 30 expands until it conforms to the shape of head 2. This helps achieve good acoustic coupling between transducer elements 20 and head 2 and helps reduce relative motion of mechanical substructure 12 and head 2.

Second Example Embodiment

Another aspect of the invention relates to ultrasound transducer assemblies that include transducer elements that may assume different positions and/or orientations based on the shape and size of a subject's head. Since the positions and/or orientations of such transducer elements can vary between subject to subject, it is desirable to measure or at least estimate these positions and/or orientations of the transducer elements to reduce errors in beamforming. Beamforming errors can cause problems such as undesired acoustic beam patterns and incorrect focus.

In some embodiments, ultrasound transducer assemblies are configured to measure or estimate: positions of transducer elements, orientations of transducer elements, a position of the head and/or an orientation of the head. The ultrasound transducer assemblies may transmit these measurements or estimations to an ultrasound system. Advantageously, the ultrasound system may calculate ultrasound parameters (e.g. the set of transducer elements to be excited, the timing of the excitation of the transducer elements, the amplitude of excitation of each transducer element, phase delays, etc.) based on the measurements made by the ultrasound transducer assembly.

For example, the ultrasound system (e.g. ultrasound system 5) may turn off transducer elements 20 that are not properly oriented (e.g. too oblique) for delivering ultrasound energy in a meaningful way to a target region. This can happen since the radiation patterns of transducer elements 20 are not uniformly spherical. As an example, circular plane transducer elements 20 emit radiation patterns that approximate a jinc function (sometimes called a "sombrero function"). For target points (i.e. points in tissue of subject 3) located at certain angles from transducer element 20, the amount of ultrasound energy delivered to these points is less than the amount of ultrasound energy delivered to target points located directly in front of transducer element 20. Ultrasound system 5 may be configured to calculate the expected amount of ultrasound energy delivered to certain points based on the location and/or orientation of transducer element 20, a pre-established radiation pattern of transducer element 20, the dimensions of transducer element 20, etc. If the calculated expected amount is too low, transducer element 20 may be turned off in some cases.

In another example, the position and orientation of transducer element 20 may be processed by an ultrasound system to calculate the acoustic path length between a specific transducer element 20 and a target region. The acoustic path length can be calculated, for example, by creating models of head 2 (which includes the various layers of the head tissue such as skull bone, brain tissue, etc.) and calculating the propagation path between transducer element 20 and the target region. After the path length is calculated, the ultrasound system may cause transducer element 20 to deliver ultrasound energy with certain phases to focus the ultrasound energy at the target region.

Figure 2:
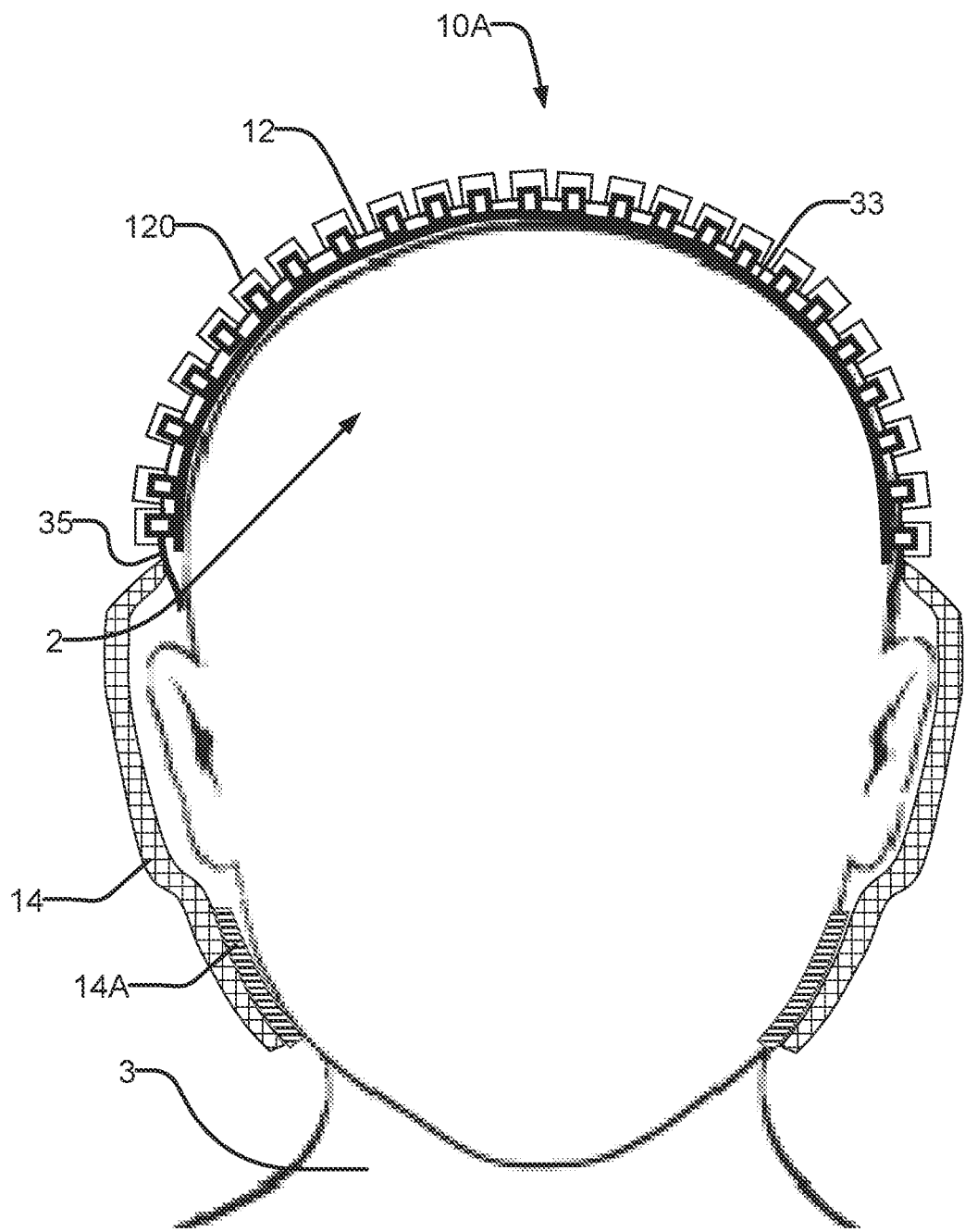
FIG. 2 schematically illustrates an ultrasound transducer assembly according to another example embodiment of the invention.

FIG. 2 schematically illustrates an ultrasound transducer assembly 10A according to a second example embodiment. Transducer assembly 10A is mounted on head 2 of subject 3. Ultrasound transducer assembly 10A comprises a rigid mechanical substructure 12 that supports one or more transducer element housings 120. Ultrasound transducer assembly 10A optionally includes a jacket 30 as described above, although this is typically not necessary.

As shown in FIG. 2, rigid mechanical substructure 12 comprises a rigid frame 14. Frame 14 may include an elastic band 35 extending circumferentially around head 2 of subject 3 for maintaining acoustic coupling gel 33 on head 2. Band 35 may be fused or mechanically coupled to a bottom rim of mechanical substructure 12 as shown in FIG. 2.

Transducer Element Housing

Figure 2A:
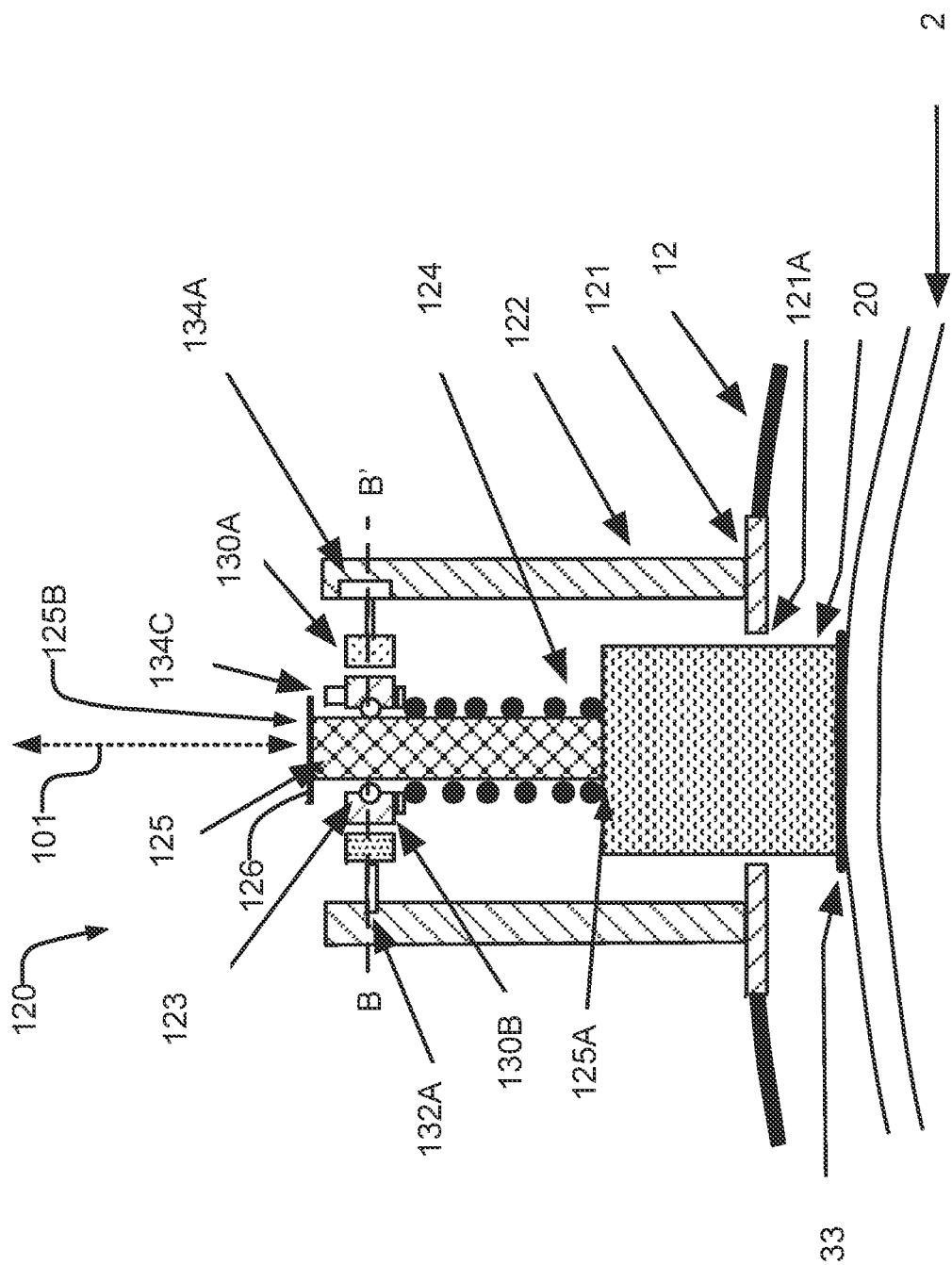
FIG. 2A is a front cross-sectional view of a transducer element of the FIG. 2 ultrasound transducer assembly.

FIG. 2A schematically illustrates a cross-section of an example transducer element housing 120. Transducer element housing 120 comprises a housing base 121 and a housing body 122. Housing base 121 is mechanically coupled to mechanical substructure 12. Housing body 122 houses a spring loaded shaft 125 (e.g. a shaft 125 loaded with spring 124) that is coupled to transducer element 20 at its first end 125A and one or more pivoted supports 130 at its second end 125B. Shaft 125 optionally includes a lid 126 located at second end 125B to prevent pivoted supports 130 and/or transducer elements 20 from separating from transducer element housing 120.

As depicted in FIG. 2A, transducer element 20 normally projects inward through a gap 121A in housing base 121. When subject 3 puts on ultrasound transducer assembly 10A, head 2 contacts transducer element 20. In some cases, head 2 may push transducer element 20 radially outward on axis 101 toward mechanical substructure 12. When transducer element 20 is pushed toward mechanical substructure 12, spring 124 applies a restoring force on transducer element 20 along radial axis 101 toward head 2. The position of transducer element along axis 101 may shift based on the shape and/or size of head 2.

Supports 130 may allow shaft 125 and transducer element 120 coupled thereto to rotate about one or more axes. In the example embodiment shown in FIG. 2A, pivoted supports 130 comprise a gimbal arrangement that allows transducer element 20 to assume an orientation (e.g. a pitch and a yaw) that conforms to the shape of head 2. The gimbal arrangement includes a first ring 130A (i.e. an outer ring) coupled to transducer element housing 122 via a first rotary axle 132A and a second ring 130B (i.e. an inner ring) coupled to first ring 130A via a second rotary axle 132B (see FIG. 2B). First rotary axle 132A allows first ring 130A to pivot along axis B-B'. Second rotary axle 132B allows second ring 130B to pivot along axis C-C'.

Shaft 125 is coupled to second ring 130B. Shaft 125 may be coupled to second ring 130B via two or more shaft ball bearings 123. For example, second ring 130B may include pockets cut within its body to receive ball bearings 123. Ball bearings 123 contact shaft 125 and provide a rolling surface for shaft 125 to move up and down along axis 101 when, for example, head 2 pushes against transducer element 20.

In some embodiments, transducer element housing 120 includes one or more linear encoders and/or rotary encoders. The values of the encoders may be read by an electronic device such as a microprocessor. Signals from the encoders may, for example, be carried by wiring that is routed through channels in transducer element housing 120 and/or channels in mechanical substructure 12.

Figure 2B:
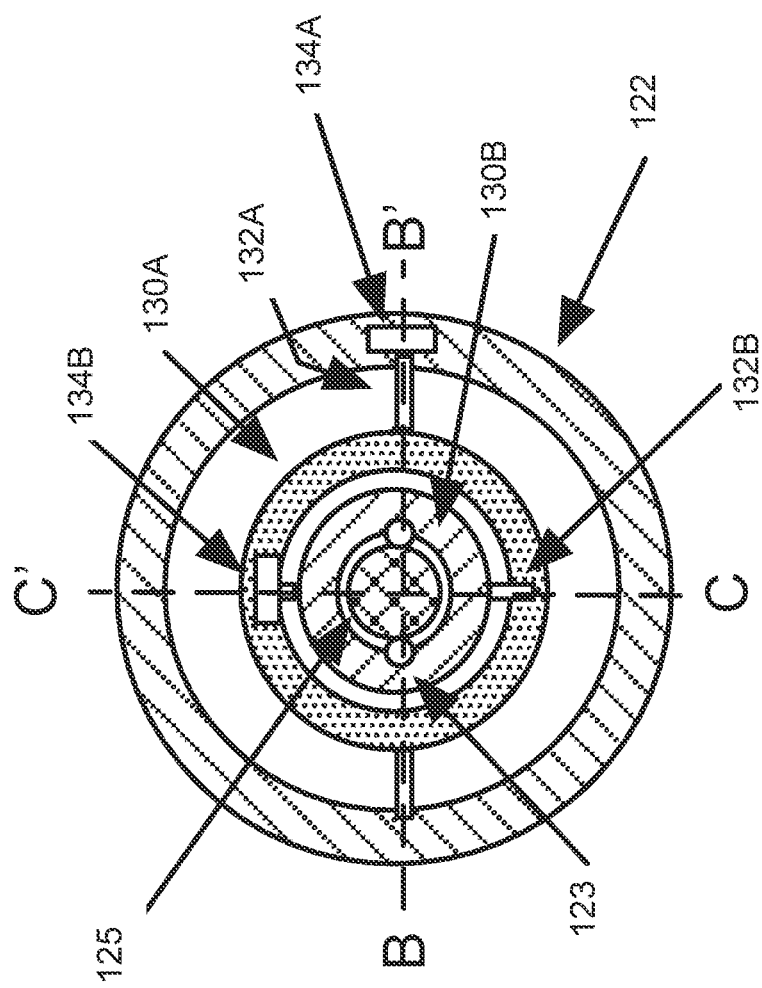
FIG. 2B is a top cross-sectional view of the FIG. 2A transducer element.

In the example embodiment shown in FIG. 2B, transducer element housing 120 includes a first rotary encoder 134A for measuring the orientation (i.e. angle relative to axis B-B') of first ring 130A, a second rotary encoder 134B for measuring the orientation (i.e. angle relative to axis C-C') of the second ring 130B, and a linear encoder 134C for measuring the position (i.e. displacement relative to an initial position) of shaft 125 along axis 101.

In some embodiments, linear encoder 134C is mounted on second ring 130B as shown in FIG. 2A. Linear encoder 134C may be located in close proximity to shaft 125. Linear encoder 134C may include magnets or magnetic sensors and shaft 125 may include magnetic stripes or other suitable markings that allow linear encoder 134C to measure displacement of shaft 125 (along axis 101) from an initial position.

Advantageously, the linear and/or rotary encoders described herein may be configured to measure a reference position such as the "zero" state of the position and/or orientation of each transducer element 20. Before installing ultrasound transducer assembly 10A on head 2, springs 124 store no restoring force so all of transducer elements 20 are biased inwards (i.e. biased in a direction away from mechanical substructure 12). The zero state may be used to determine the new position and/or orientation of each transducer element 20 after mounting ultrasound transducer assembly 10A on head 2. When ultrasound transducer assembly 10A is mounted on head 2, each transducer element 20 assumes a position and orientation corresponding to the position and orientation of head 2 at the contact point. Linear and/or rotary encoders described herein may measure the position and/or orientation of transducer elements 20 and communicate the measurements to an ultrasound system (e.g. ultrasound system 5).

Transducer elements 20 and linear and/or rotary encoders described herein may be powered by way of wires connected to a power outlet that is connectable to an ultrasound system. The wires may be located in a cable housing layer 60 as described above in relation to ultrasound transducer assembly 10. Cable housing layer 60 may include the power outlet for connecting to an ultrasound system (e.g. through a detachable cable or connector).

Third Example Embodiment

Figure 3:
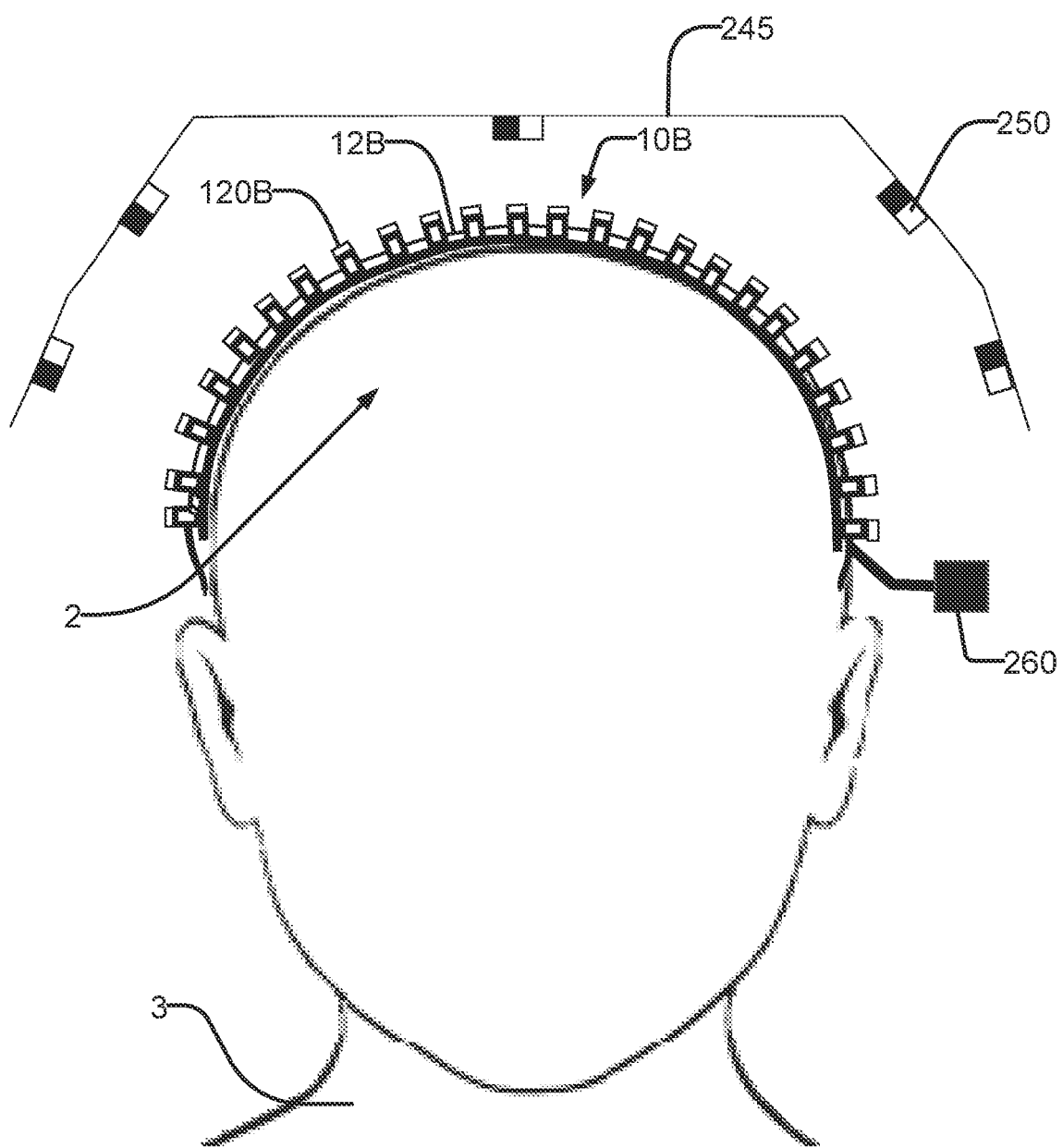
FIG. 3 schematically illustrates an ultrasound transducer assembly according to another example embodiment of the invention.

FIG. 3 schematically illustrates an ultrasound transducer assembly 10B according to a third example embodiment mounted on the head 2 of subject 3. Ultrasound transducer assembly 10B comprises a non-rigid (i.e. conformable) substrate 12B that supports one or more transducer element housings 120B. Conformable substrate 12B may be flexible and/or stretchable. Conformable substrate 12B may be made of one or more materials such as, but not limited to, silicone, Lycra™, and elastic rubber.

Each transducer element housing 120B houses a transducer element 20. Transducer element housing 120B may be mechanically coupled to conformable substrate 12B via a variety of possible mechanisms. For example, transducer element housing 120B may be glued or adhered to conformable substrate 12B. As another example, conformable substrate 12B may include grommets 200 and transducer element housing 120B may be coupled to grommets 200. These coupling mechanisms and the conformable substrate 12B allow each transducer element 20 to assume a position and orientation that match the position and orientation at the point of contact of transducer element 20 and head 2.

Figure 3A:
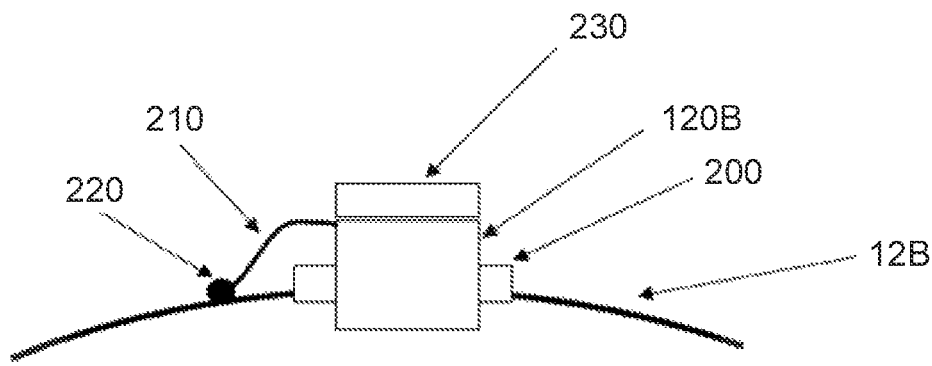
FIG. 3A illustrates a transducer element of the ultrasound transducer assembly.

FIG. 3A shows an exemplary transducer element housing 120B coupled to conformable substrate 12B through a grommet 200. Grommet 200 may contain threads for receiving corresponding threads of transducer element housing 120B.

Transducer element housing 120B may include electrical connection mechanisms 210 that allow electrical connections to be routed from conformable substrate 12B to transducer element 20. In the example embodiment shown in FIG. 3A, electrical connection mechanism 210 includes a service loop that allows transducer element 20 to assume the position and orientation of the point of contact to head 2. Conformable substrate 12B may also include a conformable channel 220 that allows routing of electrical wires. The electrical wires may be routed to a conformable substrate cable connector 260. The cable connector 260 may be at a location that does not obstruct the optical path between localizer 230 of transducer element 20 and localization sensors 250, as described in more detail below. A cable may be connected between cable connector 260 and an ultrasound system 5 to connect ultrasound transducer assembly 10B to ultrasound system 5.

In some embodiments, transducer element 20 is mechanically coupled to localizer 230. Localizer 230 may include a disk with a reflective surface, a disk with distinctive patterns, an object with a reflective surface, etc. Localizer 230 may be provided as part of transducer element housing 120B. Localizer 230 may be configured to indicate the position and/or orientation of transducer element 20 in relation to, for example, a localization sensor 250 provided on a localization base 245 (see FIG. 3). Measuring the position and/or orientation of transducer element 20 can help increase the accuracy of beamforming, as described in more detail elsewhere herein. Localization sensor 250 may, for example, be an optical (e.g. camera based) localization sensor, a magnetic localization sensor etc.

Figure 3B:
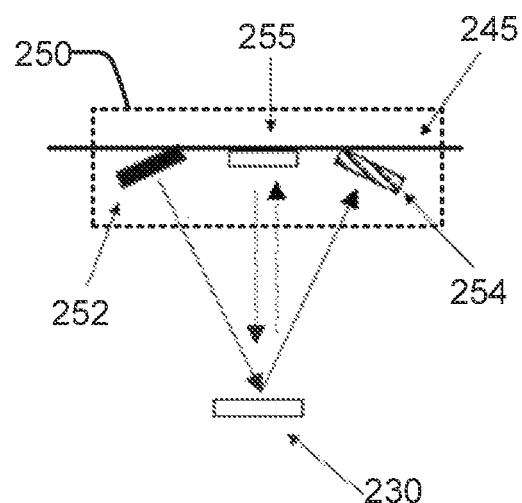
FIG. 3B illustrates an exemplary localization sensor for determining the position and orientation of the FIG. 3A transducer element.

FIG. 3B schematically illustrates a section of localization base 245, a localization sensor 250 and a localizer 230. As depicted in FIG. 3B, localization sensor 250 may include an infrared (IR) emitter 252, an infrared receiver 254 and a camera 255. Localization sensor 250 optionally includes a light source (not shown) for providing controlled lighting. In operation, IR emitter 252 may be configured to direct light toward localizer 230 and IR receiver 254 may be configured to receive light reflected from localizer 230. The position of localizer 230 may, for example, be determined by calculating the time of flight of the light travelling between IR emitter 252 and IR receiver 254.

Figures 3C, 3D, 3E:
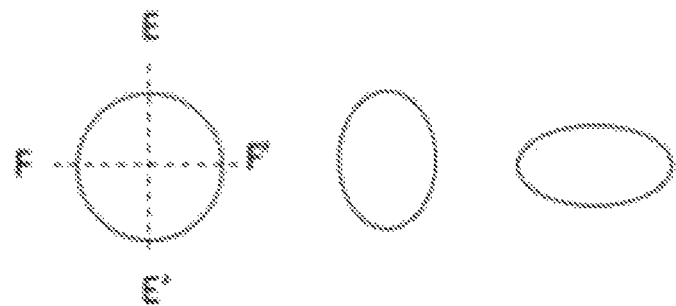
FIGS. 3C-3E illustrate various exemplary images taken by a camera of the FIG. 3B localization sensor.

The orientation of transducer element 20 may be measured with camera 255 as illustrated in FIGS. 3C, 3D and 3E. For example, camera 255 may capture an image of the surface of localizer 230 and send the image to a computing device for analysis (not shown). If the surface of localizer 230 is circular and is perpendicular to the camera axis of camera 255, then the image will show a circular disk as shown in FIG. 3C. If the reflective surface of localizer 230 is at an angle in pitch and/or yaw, then the image will show an ellipsoid. For example, if the surface of localizer 230 is rotated about the E-E' axis in FIG. 3C, then the image taken by camera 255 may show an ellipsoid of the type illustrated in FIG. 3D. As another example, if the surface of localizer 230 is rotated about the F-F' axis in FIG. 3C, then the image taken by camera 255 may show an ellipsoid of the type illustrated in FIG. 3E. The computing device may compute or estimate the orientation of transducer element 20 based on the photograph taken by camera 255.

In some embodiments, multiple localization sensors 250 may be installed on localization base 245 to measure the position and/or orientation of some or all of transducer elements 20 of ultrasound transducer assembly 10B. In some embodiments, localization sensors 250 are mounted on a mechanical scanning platform that oscillates about an axis. The scanning platform may include encoders that measure the orientation and/or location of localization sensors 250. This allows fewer localization sensors 250 to be used.

Localization sensors 250 may include IR sensors and cameras as described above and/or other types of sensors. For example, localization sensors 250 may also include electromagnetic sensors and/or radio frequency sensors to detect the position and/or orientation of transducer element 20.

Supplementary Features for all Example Embodiments

Figure 4A:
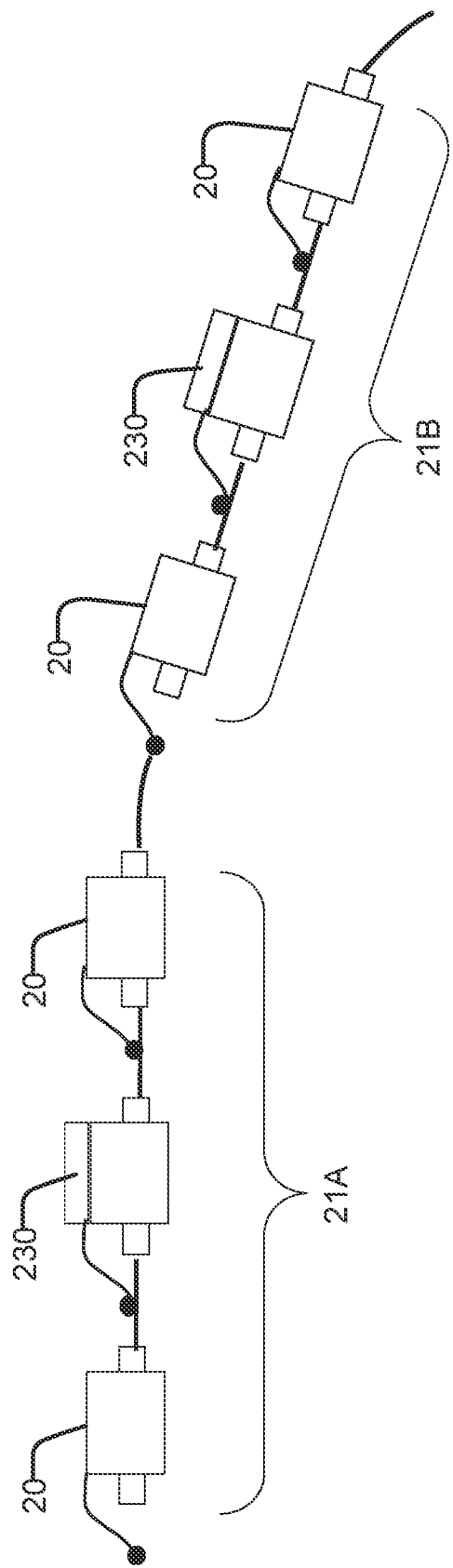
FIG. 4A illustrates sub-arrays comprising multiple transducer elements.

Ultrasound transducer assemblies described herein (e.g. ultrasound transducer assembly 10, 10A, 10B) may include transducer elements 20 that are grouped in one or more sub-arrays 21. FIG. 4A schematically illustrates a first sub-array 21A and a second sub-array 21B. The group of transducer elements 20 that form sub-array 21 may share a common substrate or mechanical substructure. That is, sub-array 21 may be a self-contained unit with electronics such as transmit drive electronics integrated within the structure of sub-array 21 to drive transducer elements 20. Each transducer element 20 within a sub-array 21 may be optimized differently and/or may perform different functions. For example, some transducer elements 20 in sub-array 21 may be optimized for transmitting low frequency ultrasound energy while other transducer elements 20 in sub-array 21 may be optimized for receiving echo ultrasound energy only.

Advantageously, sub-array 21 can reduce the number of cables and/or the complexity of the wiring required to electrically connect ultrasound machine 5 to transducer elements 20. For example, a single cable from ultrasound system 5 may drive two or more transducer elements 20 in sub-array 21 through integrated electronics included in sub-array 21. The integrated electronics can receive an input signal from ultrasound system 5 and generate one or more control signals that control the transducer elements 20 within sub-array 21.

The type of electronics can depend on the types of transducer elements 20 included in sub-array 21. For example, where sub-array 21 includes only low-frequency transducer elements 20, the electronics may include an ultrasound transmit driver circuit per transducer element 20, digital electronics for sequencing the operation of transducer elements 20 through the transmit driver circuits, and digital electronics for receiving information from and sending information to the ultrasound system. In this case, only a few DC power lines and a few digital signal lines are required between the ultrasound system and sub-array 21 containing multiple elements. Where sub-array 21 includes transducer elements 20 that execute multiple functions (e.g. some delivering low frequency ultrasound energy, others receiving echo ultrasound energy, etc.), the integrated electronics may include low-noise amplifiers (one for every transducer element 20 operating in receive mode) and/or other additional circuits.

In some embodiments, the number of localizers 230 in sub-array 21 is less than the number of transducer elements 20. For example, a sub-array 21A may include three transducer elements 20 but only one localizer 230. In sub-array 21A, each transducer element has the same orientation but different position. Since the position of each transducer element 20 relative to each other in sub-array 21A is fixed and therefore known, the position and orientation of all three transducer elements 20 in sub-array 21A can be calculated based on the position and orientation values measured from localizer 230.

Figure 4B:
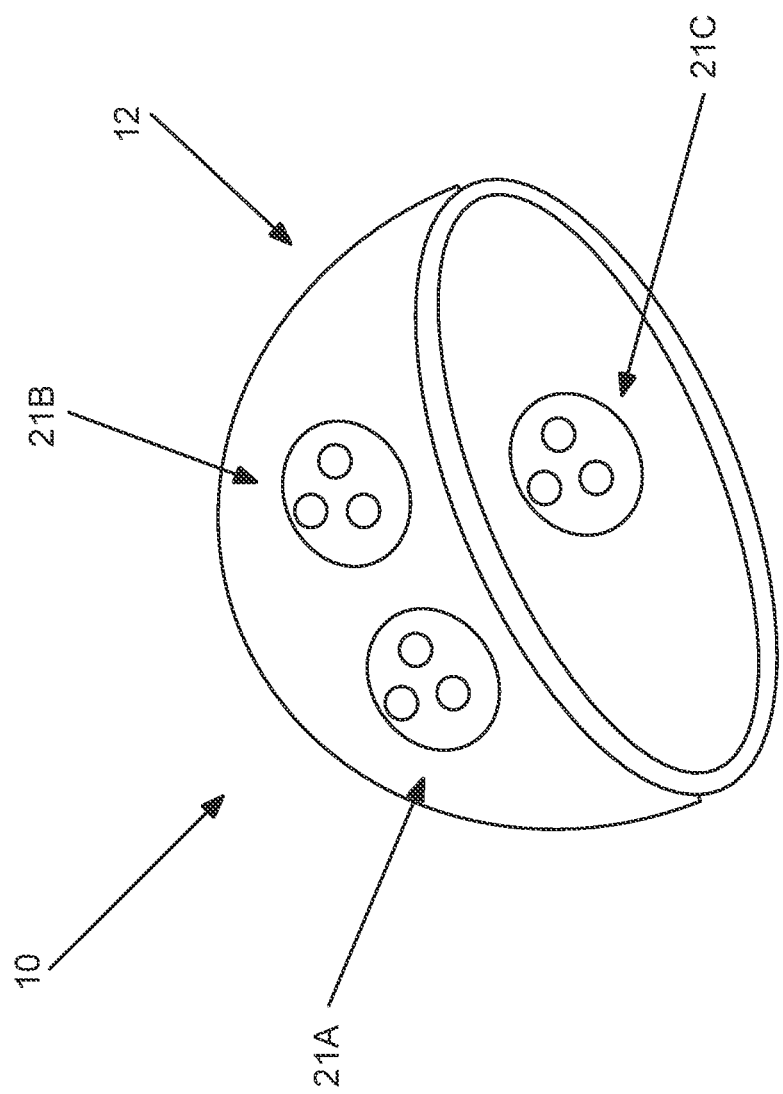
FIG. 4B illustrates an ultrasound transducer assembly comprising sub-arrays of the type shown in FIG. 4A.

FIG. 4B shows an example embodiment of an ultrasound transducer assembly 10 having three sub-arrays 21A, 21B, 21C. Ultrasound transducer assemblies described herein may include any suitable number of sub-arrays 21.

Figure 5A:
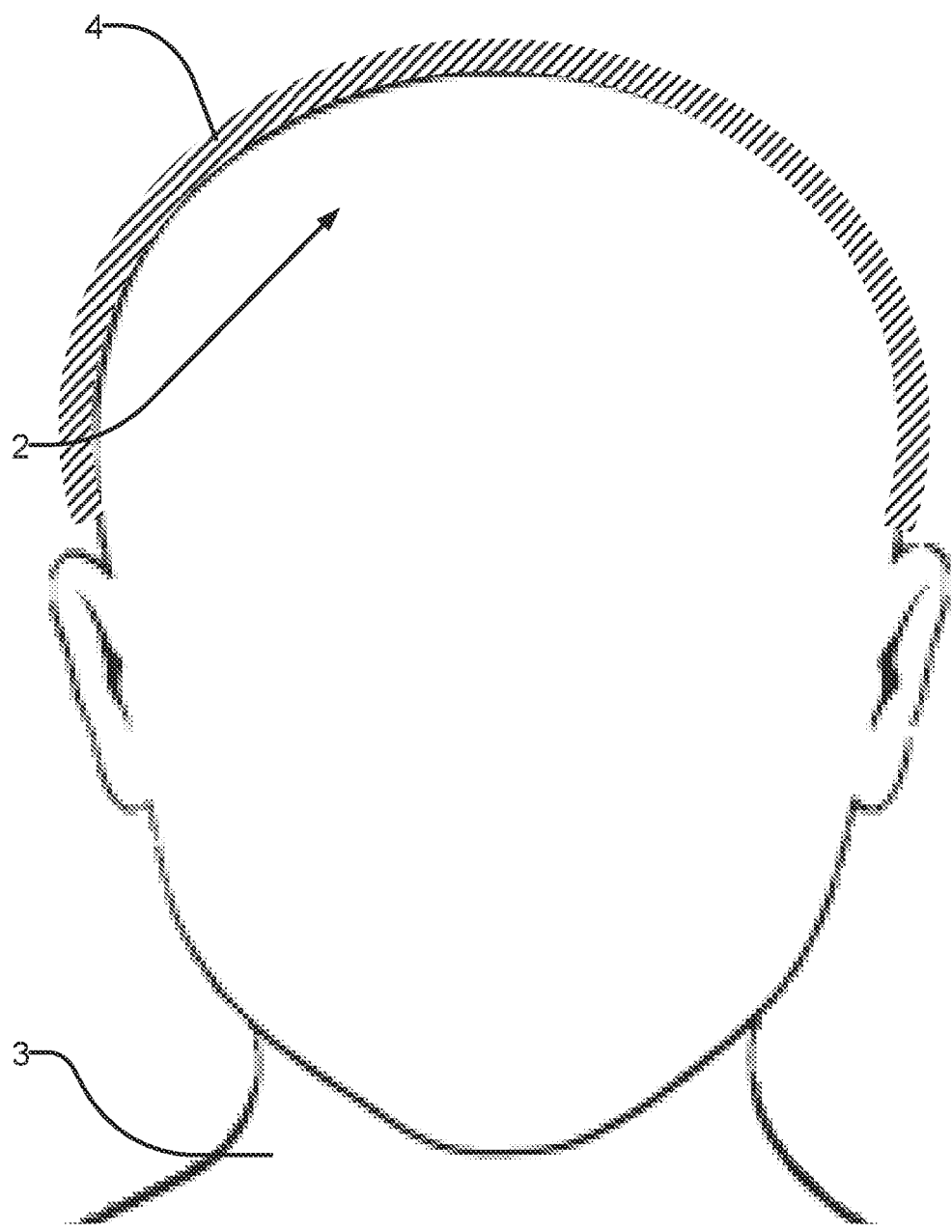
FIGS. 5A-5C illustrate an exemplary technique to achieve acoustic coupling between a transducer element and the subject's head.
Figure 5B:
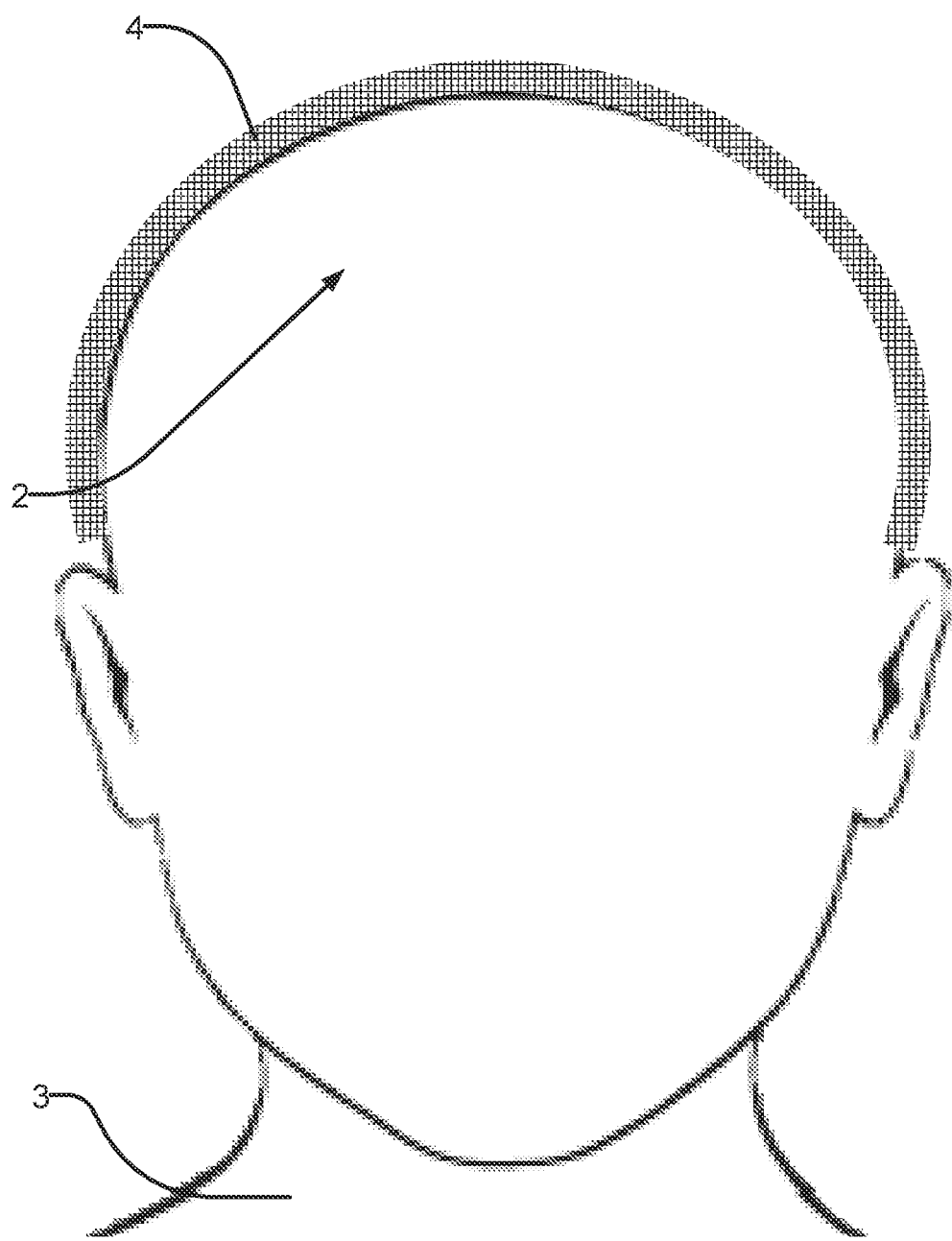
Figure 5C:
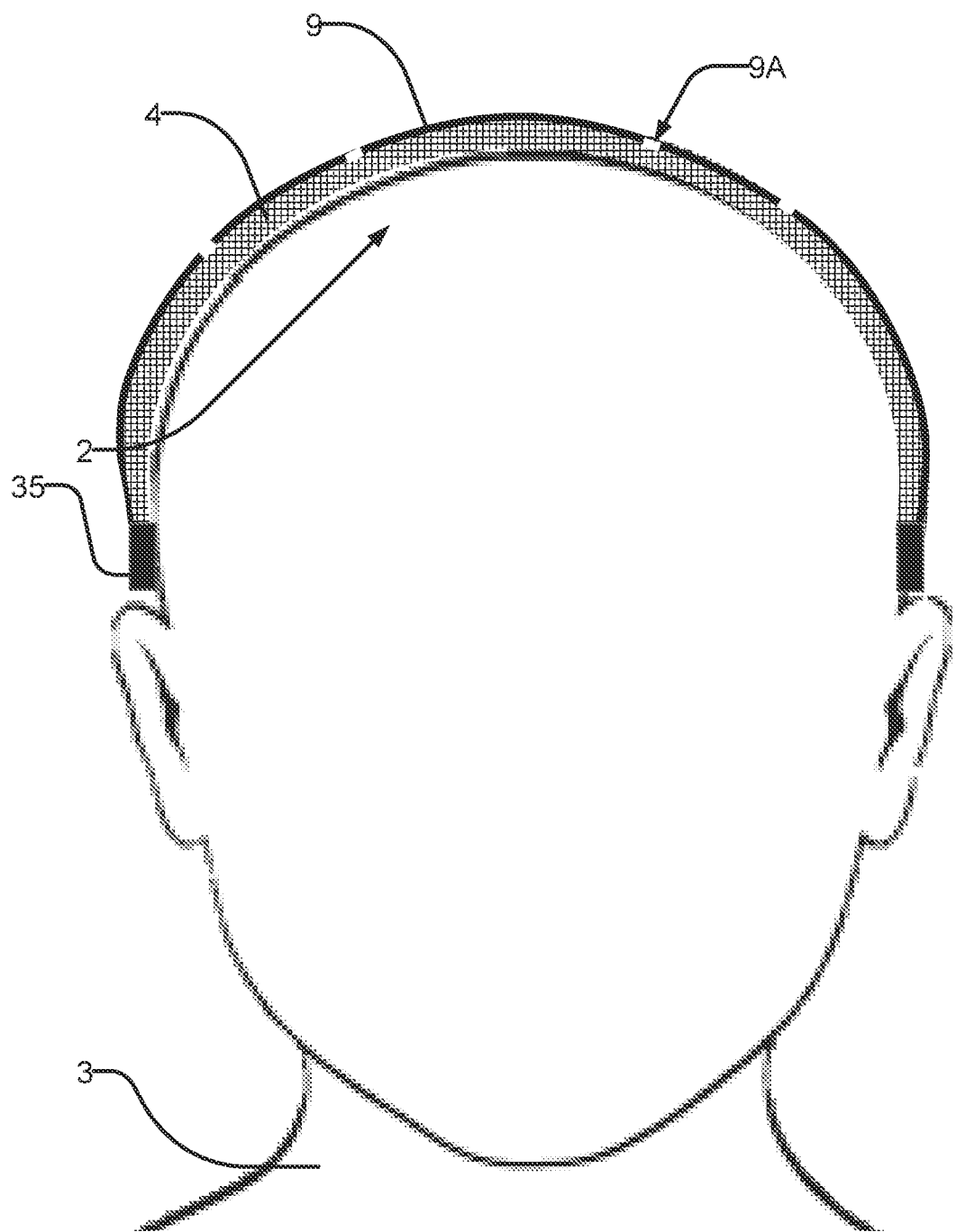

An additional aspect of the invention relates to techniques for achieving acoustic coupling between transducer elements 20 and head 2. FIG. 5A illustrates a subject 3 with hair 4. A layer of acoustic coupling gel may be applied to hair 4 (or scalp if subject 3 has no hair) as shown in FIG. 5B. After applying the acoustic coupling gel to head 2, a head cover 9 may be placed over head 2 as shown in FIG. 5C. Head cover 9 may be made of an elastic material and may also include a tight elastic band 35 at its bottom edge as shown in FIG. 5C. The elastic characteristics of head cover 9 allows cover 9 to accommodate various head sizes and shapes. The tight elastic band at the bottom edge prevents or reduces seepage of the gel outside cover 9. Head cover 9 may also include one or multiple perforations 9A as shown in the FIG. 5C. Perforations 9A allow air to escape as cover 9 is fitted over head 2. Perforations 9A may also be used to apply gel to head 2 at locations where air may be present. Head cover 9 may be made of various materials such as silicone, nylon, etc. Head cover 9 may be a single use item (e.g. made of a disposable material).

Another additional aspect of the invention relates to an imaging array that can used in connection with ultrasound transducer assemblies described herein to measure the relative position of the head in relation to the ultrasound transducer assembly. In some cases, it is desirable to measure or estimate the position of head 2 in relation to ultrasound transducer assembly 10. To measure or estimate the position of head 2 in relation to ultrasound transducer assembly 10, at least some of transducer elements 20 may be positioned adjacent to the thin parts of the skull of subject 3 (i.e. acoustic windows). An ultrasound image of the anatomy of subject 3 (e.g. the Circle-of-Willis) is obtained using such transducer elements 20. The resulting image(s) may then be aligned or registered with an image of subject 3 obtained previously with another modality such as magnetic resonance imaging (MRI). As MRI is capable of producing highly resolved and diagnostic quality images of the brain, areas of the brain that need therapy, for example, by opening the blood-brain barrier can be determined or selected by a qualified professional using these images.

As the relative position of the area that needs therapy is known with respect to the anatomy that is being imaged with ultrasound, that information can be relayed back to ultrasound system 5. This information can be used to calculate the set of low frequency therapy elements of the transducer assembly that can be activated such that the therapy is delivered at the desired location.

Figure 6:
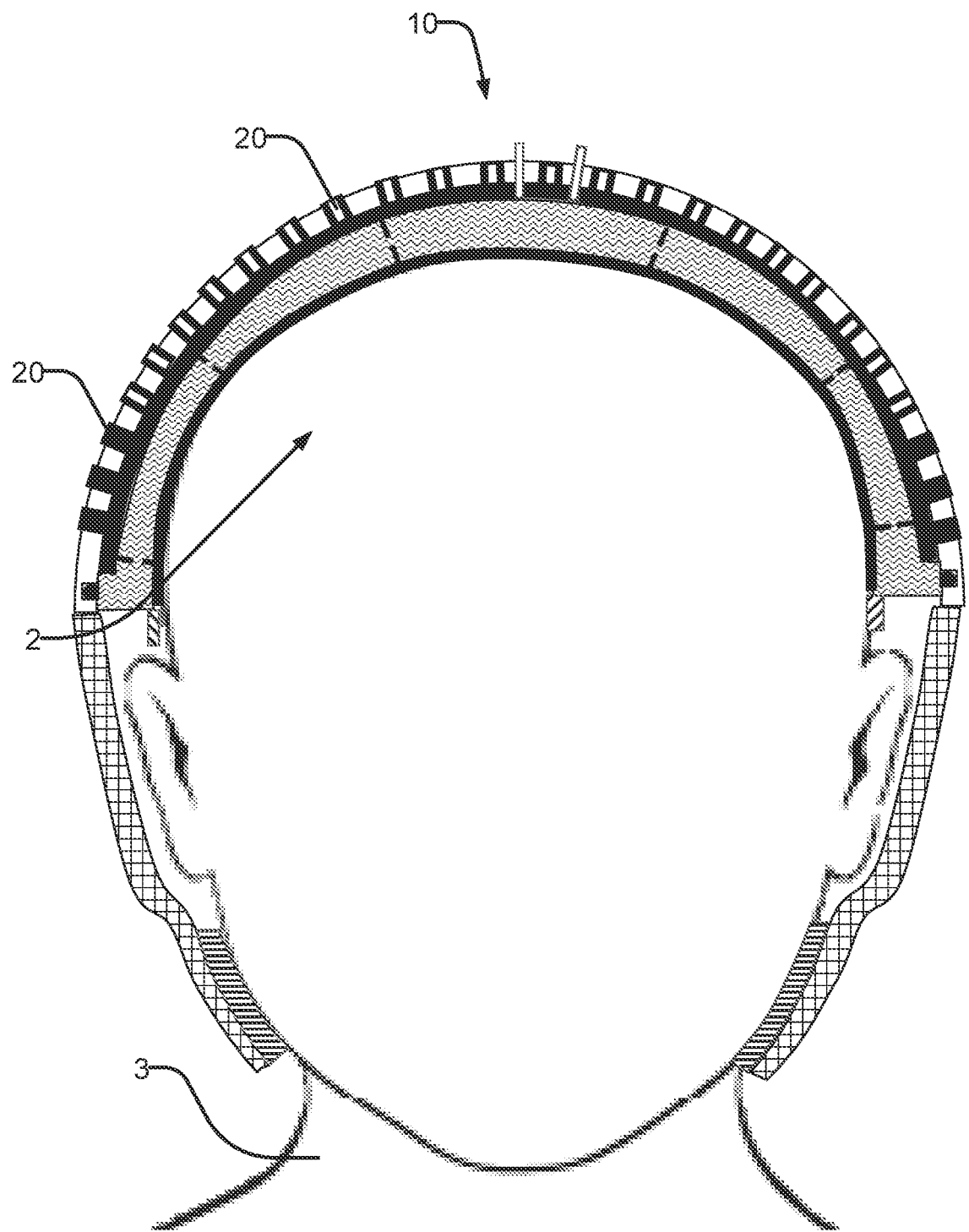
FIG. 6 illustrates an exemplary technique for measuring the orientation of the head in relation to the conformable ultrasound assembly.

FIG. 6 illustrates an example method of measuring the orientation of head 2 in relation to ultrasound transducer assembly 10. As depicted in FIG. 6, some transducer elements 20 (i.e. those in black) are positioned adjacent to the thin areas of the skull of subject 3 and are best positioned to image anatomy inside the skull. Other transducer elements 20 (i.e. those in white) are low frequency therapy elements. Using the techniques described herein, the relative position and orientation of each transducer element 20 is calculated. In particular, the relative position and orientation of the therapy transducer elements 20 are calculated with respect to the imaging elements. Since the position of anatomy that needs to receive therapy is known through the alignment of the ultrasound with MRI, a calculation can be performed to determine which set of therapy elements needs to be activated.

Interpretation of Terms

Unless the context clearly requires otherwise, throughout the description and the claims:
- "comprise", "comprising", and the like are to be construed in an inclusive sense, as opposed to an exclusive or exhaustive sense; that is to say, in the sense of "including, but not limited to";
- "connected", "coupled", "attached" or any variant thereof, means any connection or coupling, either direct or indirect, between two or more elements; the coupling, connection or attachment between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Implementations of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a control system of apparatus as described herein (which may, for example comprise an ultrasound system 5 and/or a hydraulic system 6) may implement methods as described herein by executing software instructions in a program memory accessible to the processors and/or by processing data according to logic configured in a logic circuit or configurable device such as an FPGA.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

While processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

Where a component (e.g. a jacket, valve, sensor, assembly, substructure, substrate, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary implementations of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described implementations that would be apparent to the skilled addressee, including variations obtained by: replacing features, elements and/or acts with equivalent features, elements and/or acts; mixing and matching of features, elements and/or acts from different implementations; combining features, elements and/or acts from implementations as described herein with features, elements and/or acts of other technology; and/or omitting combining features, elements and/or acts from described implementations.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that claims hereafter introduced are interpreted to include all such modifications, permutations, additions, omissions, and sub-combinations as may reasonably be inferred. The scope of the claims should not be limited by the preferred implementations set forth in the examples, but should be given the broadest interpretation consistent with the description as a whole.

The invention claimed is:

1. An ultrasound transducer assembly connectable to an ultrasound system, the assembly comprising:
   a mechanical substructure having an inner surface shaped to define a cavity for receiving a head of a subject;
   one or more ultrasound transducer elements supported by the mechanical substructure; and
   a fillable jacket detachably coupleable to the inner surface of the mechanical substructure to be in acoustic contact with the one or more transducer elements, the fillable jacket comprising:
   a deformable receptacle for receiving acoustic transmission fluid in a chamber of the receptacle, such that, when the acoustic transmission fluid is introduced into the chamber, the deformable receptacle deforms to line the inner surface and to conform to the shape of a head of a subject.

2. The ultrasound transducer assembly of claim 1, wherein the fillable jacket is acoustically coupled to the mechanical substructure.

3. The ultrasound transducer assembly of claim 2, further comprising a first layer of acoustic coupling gel located between the fillable jacket and the mechanical substructure.

4. The ultrasound transducer assembly of claim 1, wherein the deformable receptacle is made of a material selected from the group consisting of: polyurethane, latex and silicone.

5. The ultrasound transducer assembly of claim 1, wherein the acoustic transmission fluid is selected from the group consisting of: degassed water, mineral oil and gel.

6. The ultrasound transducer assembly of claim 1, wherein the fillable jacket comprises:
   a port in fluid communication with the chamber; and
   a valve for controlling fluid flow through the port to thereby control the volume of the acoustic transmission fluid in the chamber.

7. The ultrasound transducer assembly of claim 6, comprising:
   a second port in fluid communication with the chamber and a second valve for controlling fluid flow through the second port;
   wherein the port is in fluid communication with an output of a hydraulic system through the valve to receive the acoustic transmission fluid in the chamber and wherein the second port is in fluid communication with the input of the hydraulic system through the second valve to return the acoustic transmission fluid from the chamber to the hydraulic system.

8. The ultrasound transducer assembly of claim 7, wherein the hydraulic system comprises electronics configured to continuously pump the acoustic transmission fluid into the chamber through the port and to continuously withdraw the acoustic transmission fluid from the chamber through the second port.

9. The ultrasound transducer assembly of claim 7, wherein the valve and the second valve comprise respective electronic sensors configured to detect a rate of fluid flow through the respective valves.

10. The ultrasound transducer assembly of claim 1, further comprising an air bubble detector for detecting air bubbles in the acoustic transmission fluid.

11. The ultrasound transducer assembly of claim 10, wherein the air bubble detector comprises at least one of the one or more ultrasound transducer elements configured to deliver a pulse of ultrasound energy.

12. The ultrasound transducer assembly of claim 7 comprising:
   an air bubble detector for detecting air bubbles in the acoustic transmission fluid;
   wherein the hydraulic system is configured to pump the acoustic transmission fluid into the chamber through the port and to withdraw the acoustic transmission fluid from the chamber through the second port in response to detection of air bubbles in the acoustic transmission fluid.

13. The ultrasound transducer assembly of claim 12, wherein the hydraulic system is configured pump the acoustic transmission fluid into the chamber at a faster rate than the rate of withdrawing the acoustic transmission fluid from the chamber.

14. The ultrasound transducer assembly of claim 1, wherein the fillable jacket further comprises an O-ring extending around a perimeter of the deformable receptacle and wherein the fillable jacket is mechanically coupled to the mechanical substructure by insertion of an edge portion of the fillable jacket including the O-ring into a channel of the mechanical substructure.

15. An ultrasound transducer assembly connectable to an ultrasound system, the assembly comprising:
- a mechanical substructure having an inner surface;
- one or more ultrasound transducer elements supported by the mechanical substructure; and
- a fillable jacket coupled to the inner surface and in acoustic contact with the one or more transducer elements, the fillable jacket comprising:
- a deformable receptacle for receiving acoustic transmission fluid in a chamber of the receptacle, such that, when the acoustic transmission fluid is introduced into the chamber, the deformable receptacle deforms to line the inner surface and to conform to the shape of a head of a subject;
- wherein the fillable jacket further comprises an O-ring extending around a perimeter of the deformable receptacle and wherein the fillable jacket is mechanically coupled to the mechanical substructure by insertion of an edge portion of the fillable jacket including the O-ring into a channel of the mechanical substructure; and
- wherein the O-ring comprises segments of an electrically conductive material, the segments in electrical contact with corresponding electrically conductive portions of the channel when the O-ring is inserted in the channel.

16. The ultrasound transducer assembly of claim 15, wherein the O-ring further comprises:
- conductive pads in electrical contact with the segments of electrically conductive material and electrical conductors on an exterior surface of the deformable receptacle.

17. The ultrasound transducer assembly of claim 16, wherein the conductive pads extend in a poloidal direction around a part of the O-ring.

18. The ultrasound transducer assembly of claim 16, wherein the O-ring comprises:
- a first conductive pad in electrical contact with a first one of the segments of electrically conductive material and a first electrical conductor printed on the exterior surface of the deformable receptacle; and
- a second conductive pad electrically isolated from the first conductive pad and in electrical contact with a second one of the segments of electrically conductive material and a second electrical conductor printed on the exterior surface of the deformable receptacle.

19. The ultrasound transducer assembly of claim 16, wherein the electrical conductors are electrically connected to at least one of: a temperature sensor configured to measure a temperature of acoustic transmission fluid in the chamber; and a temperature sensor configured to measure a temperature of the skin of a subject wearing the ultrasound transducer assembly.

20. The ultrasound transducer assembly of claim 1, further comprising one or more baffles located in the deformable chamber.

21. The ultrasound transducer assembly of claim 20, wherein the baffles are made of a material that has essentially the same acoustic impedance as that of the acoustic transmission fluid.

22. The ultrasound transducer assembly of claim 20, wherein the baffles have a thickness that is at least one of: less than a wavelength of sound in the acoustic transmission fluid; and in a range of 0.5 mm to 1.5 mm.

23. The ultrasound transducer assembly of claim 1, wherein the fillable jacket further comprises one or more of: an electroencephalography sensor, a motion sensor, and an accelerometer.

24. The ultrasound transducer assembly of claim 1, wherein the mechanical substructure comprises a retention mechanism for securing the mechanical substructure and fillable jacket coupled thereto to the head of the subject.

25. The ultrasound transducer assembly of claim 1 wherein the fillable jacket is made of a disposable material.

26. The ultrasound transducer assembly of claim 1, wherein the mechanical substructure includes a rigid frame.

27. The ultrasound transducer assembly of claim 26, wherein the frame includes a locking hinge mechanism that allows the frame to be pushed toward the head of the subject to secure the frame snugly against the head of the subject.

28. The ultrasound transducer assembly of claim 1, wherein the deformable receptacle is made of a material having a modulus of elasticity in the range of 0.5 MPa to 10 MPa.

* * * * *